United States Patent
Nomura et al.

(10) Patent No.: US 7,679,616 B2
(45) Date of Patent: Mar. 16, 2010

(54) IMAGE DATA GENERATION APPARATUS FOR ADDING ATTRIBUTE INFORMATION REGARDING IMAGE PICKUP CONDITIONS TO IMAGE DATA, IMAGE DATA REPRODUCTION APPARATUS FOR REPRODUCING IMAGE DATA ACCORDING TO ADDED ATTRIBUTE INFORMATION, AND IMAGE DATA RECORDING MEDIUM RELATED THERETO

(75) Inventors: Toshio Nomura, Hachioji (JP); Hiroyuki Katata, Chiba (JP); Norio Ito, Chiba (JP); Tadashi Uchiumi, Urayasu (JP); Tomoko Aono, Chiba (JP); Hiroaki Yabe, Matsudo (JP); Maki Takahashi, Chiba (JP); Motohiro Ito, Chiba (JP); Masatoshi Tsujimoto, Chiba (JP); Masahiro Shioi, Chiba (JP); Ryuji Kitaura, Sakura (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 197 days.

(21) Appl. No.: 10/512,058

(22) PCT Filed: Apr. 24, 2003

(86) PCT No.: PCT/JP03/05315

§ 371 (c)(1),
(2), (4) Date: Oct. 21, 2004

(87) PCT Pub. No.: WO03/092304

PCT Pub. Date: Nov. 6, 2003

(65) Prior Publication Data

US 2005/0244050 A1    Nov. 3, 2005

(30) Foreign Application Priority Data

| Apr. 25, 2002 | (JP) | 2002-124671 |
| Sep. 30, 2002 | (JP) | 2002-286098 |
| Oct. 31, 2002 | (JP) | 2002-318253 |
| Nov. 15, 2002 | (JP) | 2002-332713 |
| Dec. 6, 2002 | (JP) | 2002-355508 |

(51) Int. Cl.
*G06T 15/00* (2006.01)
(52) U.S. Cl. ........ 345/419; 345/420
(58) Field of Classification Search .......... None
See application file for complete search history.

(56) References Cited

U.S. PATENT DOCUMENTS 5,315,377 A    5/1994 Isono et al.

(Continued)

FOREIGN PATENT DOCUMENTS

EP    0644701 A2    3/1995

(Continued)

*Primary Examiner*—Ulka Chauhan
*Assistant Examiner*—Said Broome
(74) *Attorney, Agent, or Firm*—Birch, Stewart, Kolasch & Birch, LLP

(57) ABSTRACT

An image data recording apparatus includes a three-dimensional display control information generation unit receiving a parameter indicating a condition for picking up a three-dimensional image, and encoding the parameter so as to generate image pick-up condition information, and a file generation unit generating a multimedia information file including both of the image pick-up condition information and three-dimensional image data or at least one of the three-dimensional image data and two-dimensional image data.

2 Claims, 36 Drawing Sheets

U.S. PATENT DOCUMENTS

| | | | |
|---|---|---|---|
| 5,581,625 A * | 12/1996 | Connell | 382/100 |
| 6,005,607 A * | 12/1999 | Uomori et al. | 348/42 |
| 6,023,277 A * | 2/2000 | Osaka et al. | 345/419 |
| 6,233,004 B1 * | 5/2001 | Tanaka et al. | 348/48 |
| 6,313,866 B1 | 11/2001 | Akamatsu et al. | |
| 6,496,598 B1 * | 12/2002 | Harman | 382/154 |
| 6,507,358 B1 | 1/2003 | Mori et al. | |
| 6,657,655 B1 | 12/2003 | Iizuka et al. | |
| 6,674,894 B1 * | 1/2004 | Parker et al. | 382/154 |
| 6,747,642 B1 * | 6/2004 | Yasumoto | 345/419 |
| 6,765,568 B2 * | 7/2004 | Swift et al. | 345/419 |
| 2003/0048354 A1 | 3/2003 | Takemoto et al. | |
| 2003/0052875 A1 * | 3/2003 | Salomie | 345/419 |
| 2003/0128273 A1 | 7/2003 | Matsui et al. | |
| 2005/0248561 A1 | 11/2005 | Ito et al. | |

FOREIGN PATENT DOCUMENTS

| | | |
|---|---|---|
| EP | 0751690 A2 | 1/1997 |
| EP | 0 888 018 A1 | 12/1998 |
| EP | 0969418 A2 | 1/2000 |
| JP | 04-241593 A | 8/1992 |
| JP | 5-30538 A | 2/1993 |
| JP | 5-122733 A | 5/1993 |
| JP | 8-317425 A | 11/1996 |
| JP | 09-101482 A | 4/1997 |
| JP | 10-336705 A | 12/1998 |
| JP | 11-041627 A | 2/1999 |
| JP | 11-113028 A | 4/1999 |
| JP | 11-164329 A | 6/1999 |
| JP | 11-191895 A | 7/1999 |
| JP | 2000-197074 A | 7/2000 |
| JP | 2001-45523 A | 2/2001 |
| JP | 2001-103516 A | 4/2001 |
| JP | 2001-197521 A | 7/2001 |
| JP | 2002-095018 A | 3/2002 |
| JP | 2003-111101 A | 4/2003 |
| WO | WO-03/092303 A1 | 11/2003 |

* cited by examiner

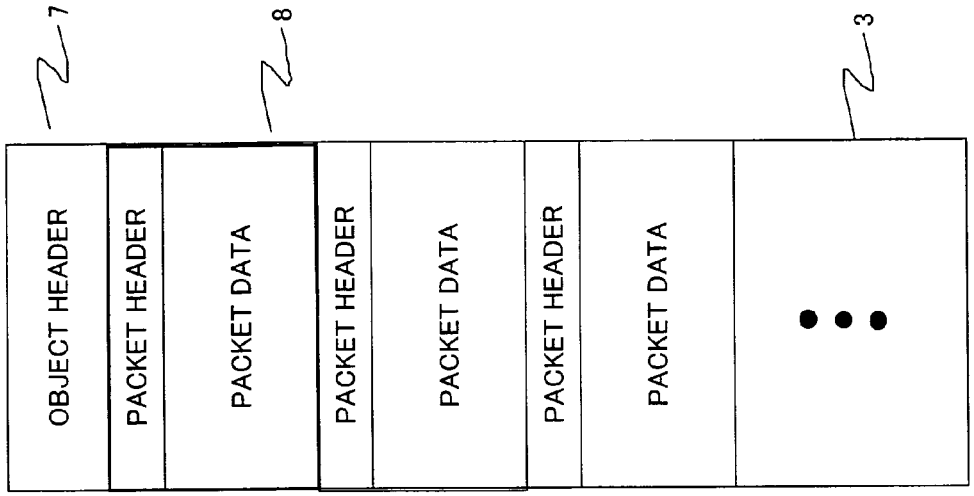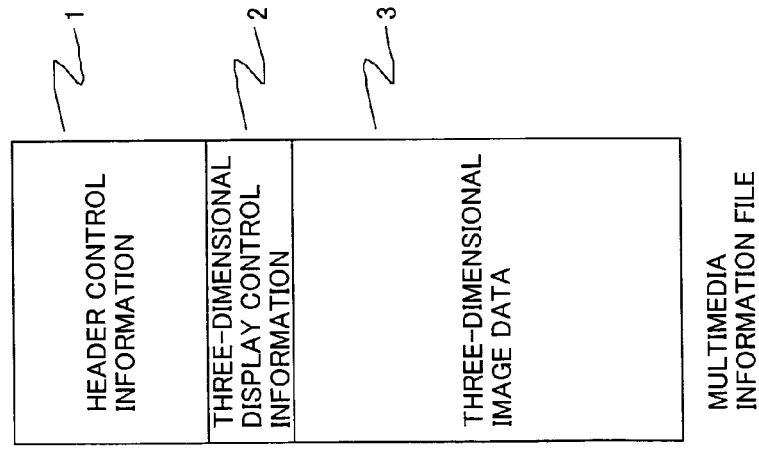

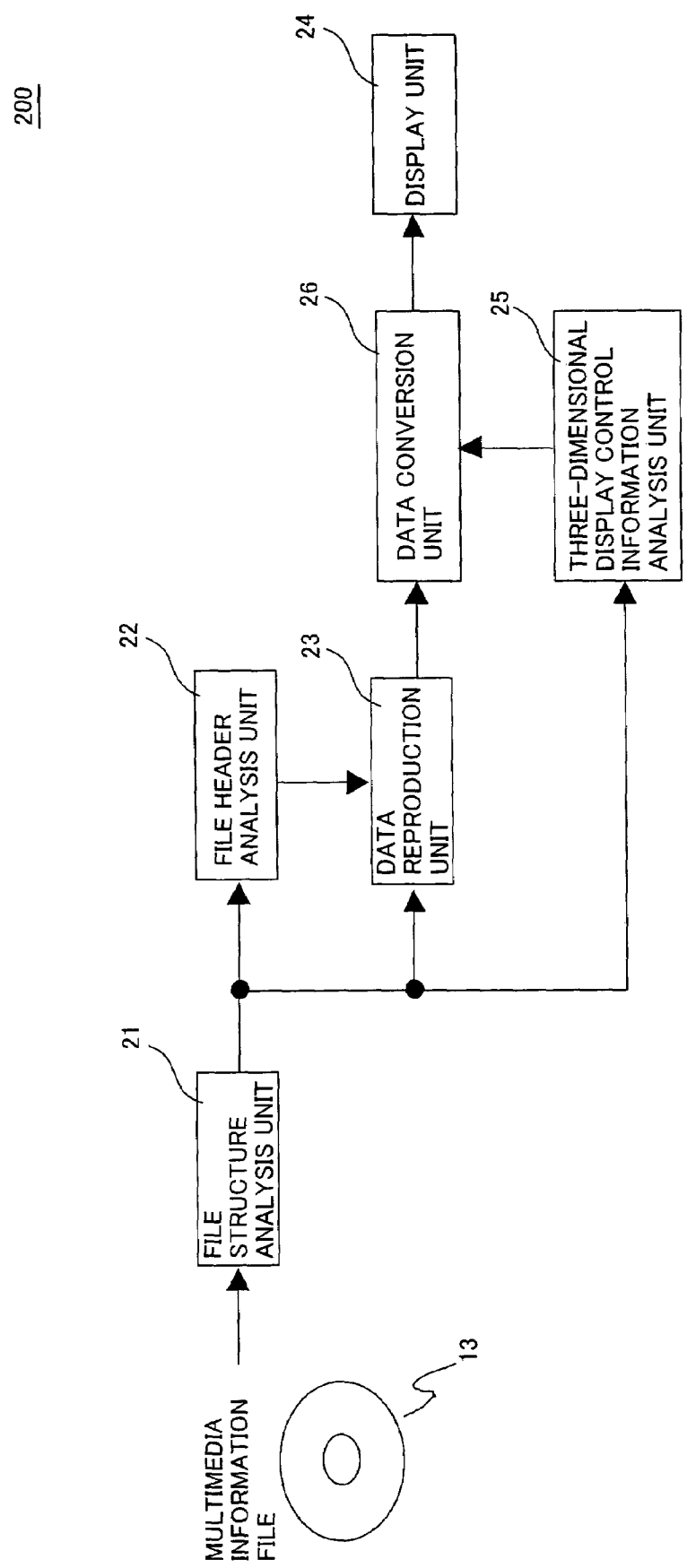

FIG.4A

```
OBJECT ID      : ID INDICATING THREE-DIMENSIONAL DISPLAY CONTROL
                 INFORMATION
OBJECT SIZE    : SIZE OF THIS INFORMATION OBJECT
NUMBER OF VIEWPOINTS    : 2
VIEWPOINT POSITION L    : STREAM NUMBER 2
VIEWPOINT POSITION R    : STREAM NUMBER 3
DIRECTION OF SUB-SAMPLING  : HORIZONTAL DIRECTION
CAMERA ARRANGEMENT      : PARALLEL
PARALLAX SHIFT LIMIT              ±16 PIXELS
BORDER DISPLAY                    YES
BORDER IMAGE DATA                 PATTERN 2
PARALLAX IMAGE SWITCHING PITCH    1 SUB PIXEL
SAMPLING PATTERN                  RESOLUTION PRIORITY
IMAGE ARRANGEMENT                 LEFT AND RIGHT, SIDE BY SIDE
                                  (IMAGE FOR LEFT EYE ON LEFT SIDE)
REVERSAL                          IMAGE ON RIGHT SIDE TO BE REVERSED
```

FIG.4B

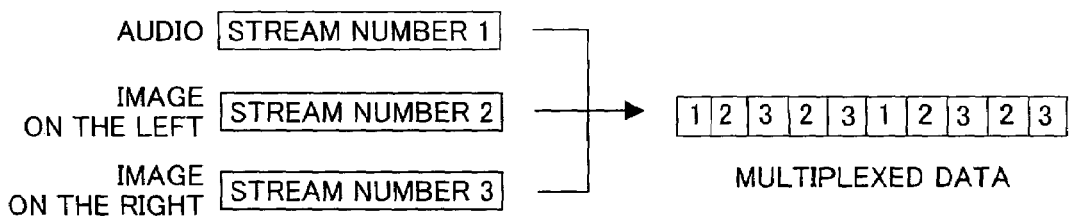

FIG.4C

| INDEX | MEANING |
|---|---|
| 0 | NO SUB-SAMPLING |
| 1 | HORIZONTAL DIRECTION |
| 2 | VERTICAL DIRECTION |
| 3 | HORIZONTAL AND VERTICAL DIRECTIONS |

FIG.6

| | |
|---|---|
| OBJECT ID | : ID INDICATING THREE-DIMENSIONAL DISPLAY CONTROL INFORMATION |
| OBJECT SIZE | : SIZE OF THIS INFORMATION OBJECT |
| NUMBER OF VIEWPOINTS | : 6 |
| VIEWPOINT POSITION 1 | : STREAM NUMBER 2 |
| VIEWPOINT POSITION 2 | : STREAM NUMBER 3 |
| VIEWPOINT POSITION 3 | : STREAM NUMBER 4 |
| VIEWPOINT POSITION 4 | : STREAM NUMBER 5 |
| VIEWPOINT POSITION 5 | : STREAM NUMBER 6 |
| VIEWPOINT POSITION 6 | : STREAM NUMBER 7 |
| DIRECTION OF SUB-SAMPLING | : HORIZONTAL DIRECTION |
| ⋮ | |

```
OBJECT ID        : ID INDICATING THREE-DIMENSIONAL
                   DISPLAY CONTROL INFORMATION
OBJECT SIZE      : SIZE OF THIS INFORMATION OBJECT
NUMBER OF VIEWPOINTS : 2
VIEWPOINT POSITION L  : STREAM NUMBER 2
VIEWPOINT POSITION R  : STREAM NUMBER 2
DIRECTION OF SUB-SAMPLING : HORIZONTAL DIRECTION

```
OBJECT ID       : ID INDICATING THREE-DIMENSIONAL DISPLAY CONTROL
                  INFORMATION
OBJECT SIZE     : SIZE OF THIS INFORMATION OBJECT
NUMBER OF VIEWPOINTS  : 2
VIEWPOINT POSITION L  : STREAM NUMBER 2
VIEWPOINT POSITION R  : STREAM NUMBER 3
DIRECTION OF SUB-SAMPLING
OF IMAGE FOR LEFT EYE    : NO SUB-SAMPLING
DIRECTION OF SUB-SAMPLING
OF IMAGE FOR RIGHT EYE   : HORIZONTAL DIRECTION
CAMERA ARRANGEMENT   : PARALLEL
PARALLAX SHIFT LIMIT           : ±16 PIXELS
BORDER DISPLAY                 : YES
BORDER IMAGE DATA              : PATTERN 2
PARALLAX IMAGE SWITCHING PITCH : 1 SUB PIXEL
SAMPLING PATTERN               : RESOLUTION PRIORITY
IMAGE ARRANGEMENT              : LEFT AND RIGHT, SIDE BY SIDE
                                 (IMAGE FOR LEFT EYE ON LEFT SIDE)
REVERSAL                       : IMAGE ON RIGHT SIDE TO BE REVERSED
                         ⋮
```

FIG.14B

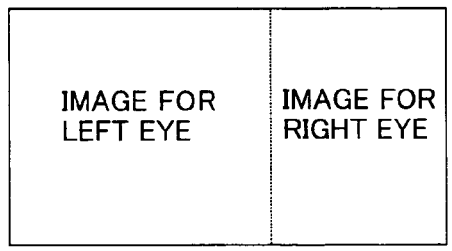

IMAGE          IMAGE
ON THE LEFT    ON THE RIGHT

IMAGE          IMAGE
ON THE LEFT    ON THE RIGHT

FIG.16

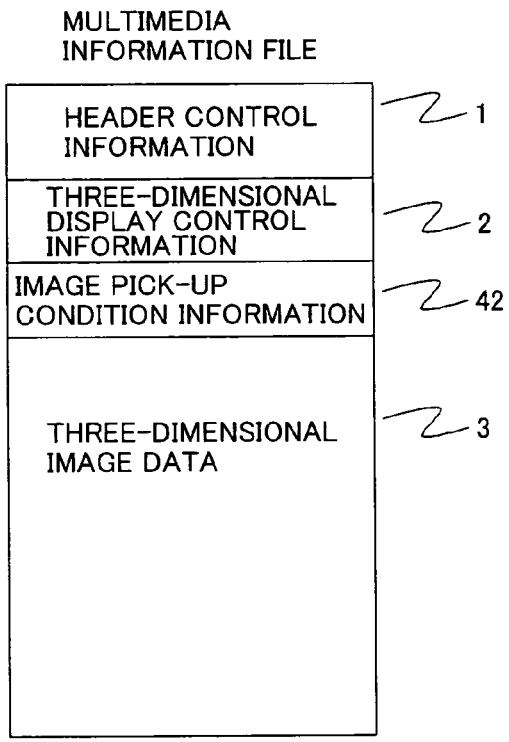

MULTIMEDIA INFORMATION FILE

- HEADER CONTROL INFORMATION — 1
- THREE-DIMENSIONAL DISPLAY CONTROL INFORMATION — 2
- IMAGE PICK-UP CONDITION INFORMATION — 42
- THREE-DIMENSIONAL IMAGE DATA — 3

FIG.17

```
OBJECT ID         : ID INDICATING IMAGE PICK-UP
                    CONDITION INFORMATION
OBJECT SIZE       : SIZE OF THIS INFORMATION OBJECT
NUMBER OF VIEWPOINTS : 2
CAMERA ARRANGEMENT   : PARALLEL
```

SPECIFIC PARAMETER ASSOCIATED WITH CAMERA
AT VIEWPOINT POSITION L
      :

SPECIFIC PARAMETER ASSOCIATED WITH CAMERA
AT VIEWPOINT POSITION R
      :

POSITION OF CAMERA L  :  REFERENCE
POSITION OF CAMERA R  :  (65, 0, 0)
CONVERGENCE ANGLE     :  0 DEGREE
          :

FIG.18

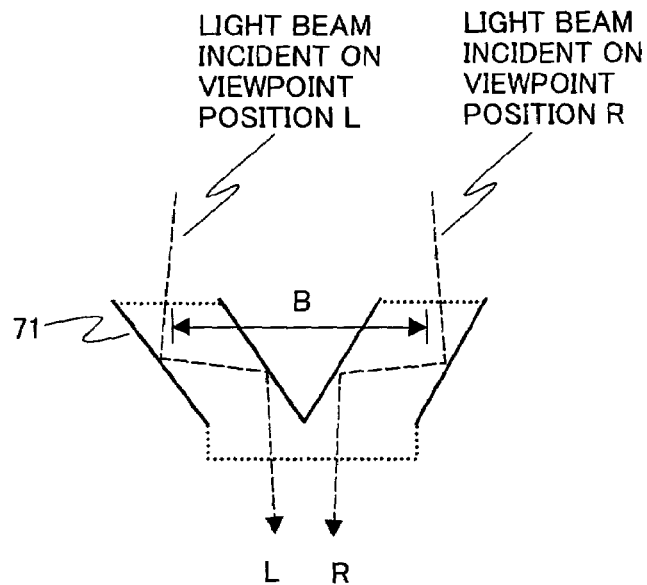

FIG.19

```
OBJECT ID       : ID INDICATING IMAGE PICK-UP
                  CONDITION INFORMATION
OBJECT SIZE     : SIZE OF THIS INFORMATION OBJECT
NUMBER OF VIEWPOINTS : 2
CAMERA ARRANGEMENT   : CONVERGENT
```
```
<INFORMATION ON CAMERA ADAPTER>
ADAPTER MANUFACTURER : P
ADAPTER TYPE         : MIRROR TYPE
ADAPTER MODEL        : XYZ08-AJ
        :
```
```
BASE LENGTH       : 50mm
CONVERGENCE ANGLE : 30 DEGREE
POP-UP DIRECTION  : POP-UP ONLY
STEREO INTENSITY  : STRONG
        :
```

FIG.22

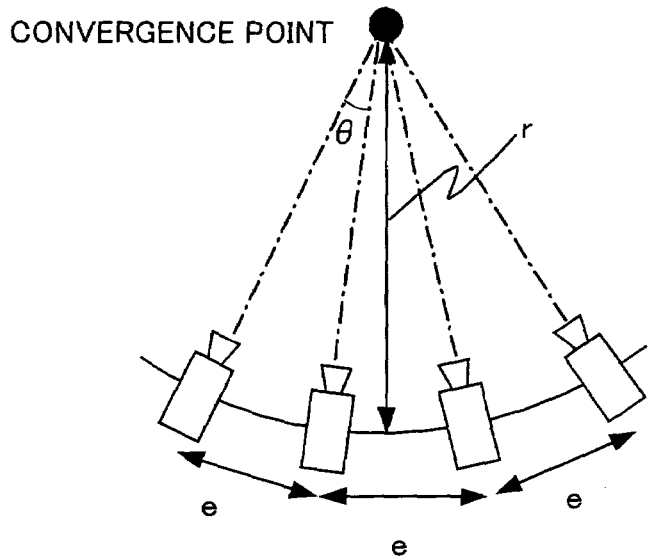

FIG.23

```
OBJECT ID      : ID INDICATING IMAGE PICK-UP
                 CONDITION INFORMATION
OBJECT SIZE    : SIZE OF THIS INFORMATION OBJECT
NUMBER OF VIEWPOINTS : 4
```
```
<SPECIFIC PARAMETER ASSOCIATED WITH
 CAMERA 1>
```
```
<SPECIFIC PARAMETER ASSOCIATED WITH
 CAMERA 2>
```
```
<SPECIFIC PARAMETER ASSOCIATED WITH
 CAMERA 3>
```
```
<SPECIFIC PARAMETER ASSOCIATED WITH
 CAMERA 4>
```
```
CAMERA ARRANGEMENT SHAPE  : LINEAR
INTERVAL BETWEEN CAMERAS  :   70mm
DISTANCE TO CONVERGENCE POINT :   100cm
                ⋮
```

FIG.26

| IMAGE FROM CAMERA 1 | IMAGE FROM CAMERA 2 | IMAGE FROM CAMERA 3 | IMAGE FROM CAMERA 4 |
|---|---|---|---|
| IMAGE FROM CAMERA 5 | IMAGE FROM CAMERA 6 | IMAGE FROM CAMERA 7 | IMAGE FROM CAMERA 8 |
| IMAGE FROM CAMERA 9 | IMAGE FROM CAMERA 10 | IMAGE FROM CAMERA 11 | IMAGE FROM CAMERA 12 |

FIG.27

```
OBJECT ID      : ID INDICATING IMAGE PICK-UP
                 CONDITION INFORMATION
OBJECT SIZE    : SIZE OF THIS INFORMATION OBJECT
NUMBER OF VIEWPOINTS
IN HORIZONTAL DIRECTION      : 4
NUMBER OF VIEWPOINTS
IN PERPENDICULAR DIRECTION   : 3
```

<SPECIFIC PARAMETER ASSOCIATED WITH CAMERA 1>

<SPECIFIC PARAMETER ASSOCIATED WITH CAMERA 2>

⋮

<SPECIFIC PARAMETER ASSOCIATED WITH CAMERA 12>

```
CAMERA ARRANGEMENT SHAPE  : PLANAR
INTERVAL BETWEEN CAMERAS  :  70mm
DISTANCE TO CONVERGENCE POINT  :  100cm
```

```
OBJECT ID              : ID FOR VERSATILE INFORMATION OBJECT
OBJECT SIZE            : SIZE OF THIS INFORMATION OBJECT
THREE-DIMENSION
IDENTIFICATION
INFORMATION            : 3D-001
NUMBER OF VIEWPOINTS   : 2
VIEWPOINT POSITION L   : STREAM NUMBER 2
VIEWPOINT POSITION R   : STREAM NUMBER 3
DIRECTION OF SUB-SAMPLING  : HORIZONTAL DIRECTION
CAMERA ARRANGEMENT     : PARALLEL
PARALLAX SHIFT LIMIT           : ±16 PIXELS
BORDER DISPLAY                 : YES
BORDER IMAGE DATA              : PATTERN 2
PARALLAX IMAGE SWITCHING PITCH : 1 SUB PIXEL
SAMPLING PATTERN               : RESOLUTION PRIORITY
IMAGE ARRANGEMENT              : LEFT AND RIGHT, SIDE BY SIDE
                                 (IMAGE FOR LEFT EYE ON LEFT SIDE)
REVERSAL                       : IMAGE ON RIGHT SIDE TO BE REVERSED

```
OBJECT ID              : ID FOR VERSATILE INFORMATION OBJECT
OBJECT SIZE            : SIZE OF THIS INFORMATION OBJECT
THREE-DIMENSION
IDENTIFICATION
INFORMATION            : 3D-001
```

← DIRECTION IN WHICH TAPE RUNS

IMAGE DATA GENERATION APPARATUS FOR ADDING ATTRIBUTE INFORMATION REGARDING IMAGE PICKUP CONDITIONS TO IMAGE DATA, IMAGE DATA REPRODUCTION APPARATUS FOR REPRODUCING IMAGE DATA ACCORDING TO ADDED ATTRIBUTE INFORMATION, AND IMAGE DATA RECORDING MEDIUM RELATED THERETO

TECHNICAL FIELD

The present invention relates to an image data generation apparatus adding attribute information to image data when image data for three-dimensional display is generated in a file, an image data reproduction apparatus, and an image data recording medium.

BACKGROUND ART

A variety of methods of displaying a three-dimensional image have conventionally been proposed. Among those methods, a "two-viewpoint system" utilizing binocular parallax has commonly been used. That is, stereoscopic vision is obtained by preparing an image for left eye and an image for right eye having binocular parallax therebetween and projecting the respective images to right and left eyes independently.

FIG. 41 is a conceptual illustration of a "time-division scheme" which is one representative of the two-viewpoint system.

In the time-division scheme, the image for left eye and the image for right eye are alternately arranged in a top-to-bottom direction as shown in FIG. 41, and a field displaying the image for left eye and a field displaying the image for right eye are alternately switched for display. Here, vertical resolution of the image for left eye and the image for right eye is half the vertical resolution of normal two-dimensional display. An observer wears shutter-type glasses in which a shutter opens and shuts in synchronization with a switching cycle of the display. As to the shutter used herein, the left eye side opens and the right eye side shuts while the image for left eye is displayed, whereas the left eye side shuts and the right eye side opens while the image for right eye is displayed. In this manner, the image for left eye is observed only with the left eye and the image for right eye is observed only with the right eye, thereby obtaining stereoscopic vision.

FIGS. 42A and 42B are conceptual illustrations of a "parallax barrier scheme" which is another representative of the two-viewpoint system.

FIG. 42A shows a principle to produce parallax, while FIG. 42B shows a screen displayed in accordance with the parallax barrier scheme.

An image including paired images for left eye and right eye arranged in stripes as shown in FIG. 42B is displayed on an image display panel 91 as shown in FIG. 42A. Then, what is called a parallax barrier 92 having slits at intervals corresponding to the images is placed in front of the image display panel. Here, stereoscopic vision is obtained by observing the image for left eye only with left eye 93 and the image for right eye only with right eye 94.

Japanese Patent Laying-Open No. 11-41627 discloses one example of a data recording format used for three-dimensional display in accordance with a lenticular scheme based on a principle the same as that of the parallax barrier scheme.

FIGS. 43A to 43C are conceptual illustrations showing one example of such a data recording format in accordance with the "lenticular scheme."

Specifically, images for left eye 101 shown in FIG. 43A and images for right eye 102 shown in FIG. 43B are sub-sampled respectively so as to prepare one mixed image 103 shown in FIG. 43C for recording. In reproduction, mixed image 103 is re-arranged so as to create a combined image as shown in FIG. 42B.

In addition to the example of the two-viewpoint system described above, there are various methods for displaying a three-dimensional image. Here, however, recorded data generally lacks compatibility among different display schemes.

For example, the data recorded so as to adapt to the time-division scheme cannot be displayed as it is on a three-dimensional display adapted to the parallax barrier scheme. Therefore, in a conventional three-dimensional display system, data is recorded on the assumption that a display method is initially fixed, without taking into account versatility of the recorded data. For example, if it is decided that a three-dimensional display adapted to the parallax barrier scheme is used, data intended to be shown on that display is recorded on a recording medium. Here, since a possibility of being shown on a display adapted to another scheme is not considered, information that the recorded data is available for the parallax barrier scheme is not recorded on a file.

There are various types of information necessary for three-dimensional display, such as the number of viewpoints or a method of sub-sampling, in addition to the display scheme. Such information, however, is not recorded on the file either because the display scheme has been fixed to one. In other words, if the same scheme is always used, it is not necessary to record such information. On the other hand, this fact remarkably impairs versatility of the recorded data. For example, as far as data adapted to the parallax barrier scheme (or the lenticular scheme) is recorded, the image for left eye and the image for right eye can be recorded as separate sequences, or alternatively, a mixed image in which the image for left eye and the image for right eye are arranged side by side so as to each occupy half an area of the screen as shown in FIG. 43C can be recorded. Alternatively, a combined image in which paired images for left eye and right eye are arranged in stripes as shown in FIG. 42B can be recorded. If a recording format is different, a processing method for subsequent display will naturally be different. It is impossible, however, to know in which format the data has been recorded, from the recorded data. Therefore, when a third party obtains the data, he/she does not know what kind of processing should be adopted for displaying the data.

DISCLOSURE OF THE INVENTION

An object of the present invention is to provide an image data generation apparatus attaining versatility of image data for three-dimensional display, an image data reproduction apparatus for reproducing the data, as well as a recording format and a recording medium.

According to one aspect of the present invention, an image data generation apparatus includes: reception means for receiving a parameter for displaying three-dimensional image data; three-dimensional image display control information generation means for generating three-dimensional image display control information by encoding the parameter; and file generation means for generating a multimedia information file including both of the three-dimensional image display control information and the three-dimensional image data or at least one of the three-dimensional image data and two-dimensional image data.

According to another aspect of the present invention, an image data generation apparatus includes: reception means for receiving a parameter indicating an image pick-up condition for a three-dimensional image; information generation means for generating image pick-up condition information by encoding the parameter; and file generation means for generating a multimedia information file including at least one of the image pick-up condition information, three-dimensional image data and two-dimensional image data.

According to yet another aspect of the present invention, an image data generation apparatus generates a multimedia information file including at least one of image pick-up condition information indicating an image pick-up condition for a three-dimensional image, three-dimensional image data and two-dimensional image data. The image pick-up condition information includes at least one of information indicating the number of parallaxes in a horizontal direction and information indicating the number of parallaxes in a direction perpendicular thereto.

According to yet another aspect of the present invention, an image data generation apparatus generates a multimedia information file including at least one of image pick-up condition information indicating an image pick-up condition for a three-dimensional image, three-dimensional image data and two-dimensional image data. The image pick-up condition information includes at least one of information indicating a camera arrangement shape, information indicating an interval between adjacent cameras, and information indicating a distance from a camera arrangement plane to a convergence point.

According to yet another aspect of the present invention, an image data reproduction apparatus includes: reception means for receiving a multimedia information file including both of three-dimensional image display control information generated by encoding a parameter for displaying three-dimensional image data and the three-dimensional image data or at least one of the three-dimensional image data and two-dimensional image data; file structure analysis means for analyzing a structure of the multimedia information file so as to extract the three-dimensional image display control information and the three-dimensional image data or the two-dimensional image data; three-dimensional image display control information analysis means for analyzing the three-dimensional image display control information; data reproduction means for reproducing the three-dimensional image data; and data conversion means for converting the reproduced three-dimensional image data. The data conversion means converts the reproduced three-dimensional image data for data for display, based on a result of analysis by the three-dimensional image display control information analysis means.

According to yet another aspect of the present invention, an image data reproduction apparatus includes: reception means for receiving a multimedia information file including three-dimensional image display control information obtained by encoding a parameter for displaying three-dimensional image data and the three-dimensional image data or two-dimensional image data; and file type determination means for analyzing an extension of the multimedia information file. The file type determination means determines whether or not the multimedia information file includes the three-dimensional image data based on the extension.

According to yet another aspect of the present invention, an image data reproduction apparatus reproduces a multimedia information file including at least one of image pick-up condition information indicating an image pick-up condition for a three-dimensional image, three-dimensional image data and two-dimensional image data. The image pick-up condition information includes at least one of information indicating the number of parallaxes in a horizontal direction and information indicating the number of parallaxes in a direction perpendicular thereto.

According to yet another aspect of the present invention, an image data reproduction apparatus reproduces a multimedia information file including at least one of image pick-up condition information indicating an image pick-up condition for a three-dimensional image, three-dimensional image data and two-dimensional image data. The image pick-up condition information includes at least one of information indicating a camera arrangement shape, information indicating an interval between adjacent cameras, and information indicating a distance from a camera arrangement plane to a convergence point.

According to yet another aspect of the present invention, an image data recording medium records a multimedia information file including both of three-dimensional image display control information generated by encoding a parameter for displaying three-dimensional image data and the three-dimensional image data or at least one of the three-dimensional image data and two-dimensional image data.

According to yet another aspect of the present invention, an image data recording medium records a multimedia information file including at least one of image pick-up condition information indicating an image pick-up condition for a three-dimensional image, three-dimensional image data and two-dimensional image data. The image pick-up condition information includes at least one of information indicating the number of parallaxes in a horizontal direction and information indicating the number of parallaxes in a direction perpendicular thereto.

According to yet another aspect of the present invention, an image data recording medium records a multimedia information file including at least one of image pick-up condition information indicating an image pick-up condition for a three-dimensional image, three-dimensional image data and two-dimensional image data. The image pick-up condition information includes at least one of information indicating a camera arrangement shape, information indicating an interval between adjacent cameras, and information indicating a distance from a camera arrangement plane to a convergence point.

According to yet another aspect of the present invention, an image data recording medium records, in a recording area, a multimedia information file including both of image pick-up condition information generated by encoding a parameter indicating a condition in picking up a three-dimensional image and three-dimensional image data or at least one of the three-dimensional image data and two-dimensional image data.

According to yet another aspect of the present invention, an image data recording medium records, in a recording area, a multimedia information file including both of three-dimensional image display control information generated by encoding a parameter for displaying three-dimensional image data and the three-dimensional image data or at least one of the three-dimensional image data and two-dimensional image data. The recording area includes an image recording area for recording the three-dimensional image data or the two-dimensional image data, an audio recording area for recording audio data, and a sub code area for recording associated information.

Therefore, according to the present invention, the three-dimensional image display control information for displaying the three-dimensional image data is recorded or configured as a multimedia information file together with the three-dimensional image data. Therefore, the three-dimensional image data can be versatile, and one kind of multimedia information file can adapt to various three-dimensional display schemes in a flexible manner.

Alternatively, according to the present invention, by analyzing the three-dimensional image display control information included in the multimedia information file, conversion of the three-dimensional image data adapted to a display method can appropriately be performed, and correct display can be achieved.

Alternatively, according to the present invention, the three-dimensional image display control information includes information indicating the number of viewpoints of the three-dimensional image data. Accordingly, the three-dimensional image data having various numbers of viewpoints can be recorded, reproduced or configured as a versatile multimedia information file.

According to the present invention, the three-dimensional image display control information includes information indicating from which viewpoint position the three-dimensional image data is obtained. Accordingly, whether the three-dimensional image data is recorded as a plurality of streams or as a single stream, appropriate data conversion can be performed.

According to the present invention, the three-dimensional image display control information includes information indicating a direction of sub-sampling of the three-dimensional image data. Accordingly, data restoration during display can correctly be performed.

According to the present invention, the three-dimensional image display control information includes information indicating arrangement of a camera that has picked up an image of the three-dimensional image data. Accordingly, appropriate viewpoint interpolation or three-dimensional model construction can be achieved.

According to the present invention, the three-dimensional image display control information includes information indicating a maximum shift amount when a parallax image of the three-dimensional image data is shifted. Accordingly, such a situation that what a creator of an image really wants to show is not displayed can be avoided.

According to the present invention, the three-dimensional image display control information includes information indicating whether or not a border is to be displayed around the image of the three-dimensional image data. Accordingly, a generator of the multimedia information file can select between displaying and not displaying the border image.

According to the present invention, the three-dimensional image display control information includes information indicating the border image data displayed around the image of the three-dimensional image data. Accordingly, an appropriate border image in accordance with the three-dimensional image data can be displayed.

BRIEF DESCRIPTION OF THE DRAWINGS

FIGS. 1A to 1C show a structure of a multimedia information file generated in an embodiment of the present invention; FIG. 1A shows a structure of a multimedia information file; FIG. 1B shows a structure of each object; and FIG. 1C shows one exemplary structure of three-dimensional image data.

FIG. 3 is a block diagram illustrating a configuration of an image data reproduction apparatus 200.

FIGS. 4A to 4C are conceptual illustrations of specific information described in three-dimensional display control information 2; FIG. 4A shows specific information described in three-dimensional display control information 2; FIG. 4B shows respective streams for audio, an image for left eye and an image for right eye; and FIG. 4C shows a table showing a direction of sub-sampling.

FIG. 5A shows an example of a two-viewpoint system; and FIGS. 5B and 5C show an example of a six-viewpoint system.

FIG. 6 is a conceptual illustration of an exemplary manner of description of a stream corresponding to a viewpoint position in a case of the six-viewpoint system.

FIGS. 8A and 8B show an example of a convergent arrangement; and FIG. 8C shows an example of a divergent arrangement.

FIG. 9A shows a state where no border image is displayed; and FIG. 9B shows a state where the border image is displayed.

FIGS. 14A and 14B are conceptual illustrations showing three-dimensional display control information as well as image data formed by arranging side by side an image for left eye and an image for right eye.

FIG. 16 is a conceptual illustration showing a multimedia information file further including image pick-up condition information 42 in addition to three-dimensional display control information 2.

FIG. 17 shows one example of specific information described in image pick-up condition information 42.

FIG. 18 is a conceptual illustration showing a camera adapter 71 attached in front of a camera lens in order to obtain images from two viewpoints.

FIG. 19 shows an example of image pick-up condition information 42 added when an image is picked up using the camera adapter.

FIG. 22 is a conceptual illustration of a camera arrangement shape when cameras are arranged annularly in image pick-up in accordance with a two-viewpoint system or a multi-viewpoint system.

FIG. 23 shows an example of image pick-up condition information when the cameras are arranged linearly.

FIG. 26 is a conceptual illustration of an image arrangement when the cameras are arranged in a form of lattice.

FIG. 27 shows an example of the image pick-up condition information when the cameras are arranged on a plane.

FIG. 28 shows an example in which a versatile ID is used as an object ID in a three-dimensional image control information object.

FIG. 29 shows three-dimension identification information.

BEST MODES FOR CARRYING OUT THE INVENTION

Figure 2:
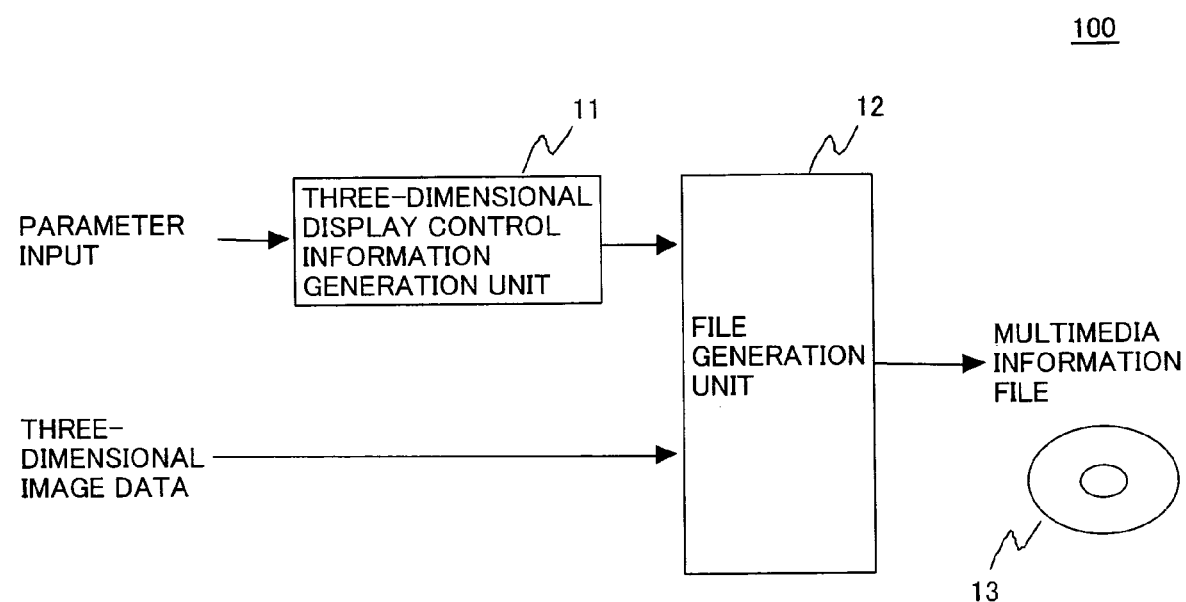
FIG. 2 is a block diagram showing a configuration of an image data recording apparatus 100 in the present embodiment.

The structure, operation and effect of the present invention are hereinafter described with reference to the drawings. It is noted that the same or like components in the drawings are denoted by the same reference characters and a description thereof is not repeated.

FIGS. 1A to 1C show a structure of a multimedia information file generated according to an embodiment of the present invention.

The multimedia information file may include any one of three-dimensional image data and two-dimensional image data. The following description is given of an exemplary multimedia information file including three-dimensional image data.

Referring to FIG. 1A, the multimedia information file includes at least three elements: header control information 1, three-dimensional display control information 2 and three-dimensional image data 3.

Three-dimensional image data 3 may be any of still-image data and moving-image data. While audio data may be recorded in the multimedia information file together with the image data, the audio data is not included here for the purpose of simplification. Additional information may also be included.

It is noted that when a multimedia information file includes two-dimensional image data, no three-dimensional display control information is added thereto.

The elements are each called object. Each object takes the form as shown in FIG. 1B. Specifically, an object ID 4 for identifying the object and an object size 5 are written first that are followed by object data 6 with its length defined by object size 5. Object ID 4 and object size 5 are together called object header. The object may have a hierarchical structure.

While header control information 1, three-dimensional display control information 2 and three-dimensional image data 3 should strictly be referred to as header control information object 1, three-dimensional display control information object 2 and three-dimensional image data object 3 respectively in FIG. 1A, they are called here without the term "object" for avoiding lengthy names.

FIG. 1C shows an exemplary structure of three-dimensional image data 3. In three-dimensional image data 3, an object header 7 including an object ID and an object size is followed by a plurality of packets 8. Packet 8 is a minimum unit used in communicating data and each packet is comprised of a packet header and packet data, It is noted that three-dimensional image data 3 is not necessarily in the packet form and may be in the form of a series of data strings.

When details of information described in the object are discussed in the following section, description of information identical to the previously-described information will not be repeated and solely a different portion will be described.

FIG. 2 is a block diagram showing a configuration of an image data recording apparatus 100 that is an example of a multimedia information generation apparatus of the present invention.

Referring to FIG. 2, image data recording apparatus 100 includes a three-dimensional display control information generation unit 11 and a file generation unit 12.

Three-dimensional display control information generation unit 11 receives necessary parameters that are externally provided and generates three-dimensional display control information as one object. File generation unit 12 receives the three-dimensional display control information and three-dimensional image data and adds header control information thereto to generate and output the multimedia information file as shown in FIGS. 1A to 1C. Here, the three-dimensional image data may be non-compressed data or compressed and encoded data.

The multimedia information file thus generated may be recorded on a recording medium 13 or delivered directly to a communication channel.

As an example of the multimedia information reproduction apparatus of the present invention, an image data reproduction apparatus in this embodiment is described below.

FIG. 3 is a block diagram illustrating a configuration of image data reproduction apparatus 200 to which a multimedia information file including three-dimensional image data as shown in FIG. 1A is input.

Referring to FIG. 3, image data reproduction apparatus 200 includes a file structure analysis unit 21, a file header analysis unit 22, a data reproduction unit 23, a display unit 24, a three-dimensional display control information analysis unit 25, and a data conversion unit 26. The multimedia information file is provided from recording medium 13 or a communication channel.

File structure analysis unit 21 identifies each of header control information, three-dimensional image data and three-dimensional display control information of the input multimedia information file, and provides the header control information to file header analysis unit 22, the three-dimensional image data to data reproduction unit 23 and the three-dimensional display control information to three-dimensional display control information analysis unit 25.

File header analysis unit 22 analyzes the header control information and provides information necessary for reproducing the three-dimensional image data to data reproduction unit 23. Data reproduction unit 23 demultiplexes data, extracts data from packets, and decodes data if the data has been compressed and encoded. Three-dimensional display control information analysis unit 25 analyzes the three-dimensional display control information and provides information derived therefrom to data conversion unit 26. Data conversion unit 26 converts the decoded three-dimensional image data to allow the data to conform to a desired three-dimensional display form, and outputs the converted data to display unit 24. Display unit 24 may be a stand-alone three-dimensional display device independent of the reproduction apparatus.

FIGS. 4A to 4C are conceptual illustrations of specific information described in three-dimensional display control information 2.

The specific information described in three-dimensional display control information 2 includes, as partially shown in FIG. 4A, number of viewpoints, respective streams corresponding to respective positions of the viewpoints, direction of sub-sampling, camera arrangement, parallax shift limit, whether a border image is to be displayed or not, border image data, parallax image switching pitch, sampling pattern, image arrangement, and whether image is reversed or not, for example.

The three-dimensional display control information shown in FIG. 4A is hereinafter described in further detail.

"Number of viewpoints" in FIG. 4A refers literally to the number of viewpoints, namely the number of parallax images, and is two when data according to the two-viewpoint system is provided.

When image pick-up is done by means of cameras, the cameras serve as eyes and the number of viewpoints in this case is accordingly the number of cameras. Since the number of human eyes is only two, data with the number of viewpoints of three or more is redundant. However, as an observer moves, the observed image changes so that a more natural stereoscopic vision can be implemented.

In FIG. 4A, subsequent to the line where the number of viewpoints is indicated, two lines (viewpoint position L, viewpoint position R) are shown where "stream number" corresponding to the left viewpoint position and that corresponding to the right viewpoint position are indicated respectively.

A detailed description of "stream number" is given below.

As shown in FIG. 4B, audio, an image for left eye and an image for right eye are provided as separate streams. It is supposed here that these are multiplexed in the packet form to be recorded. Then, in order to identify whether each packet in the multiplexed data is audio data, image data for left eye or image data for right eye, a specific stream number is allocated to each stream.

In the example shown in FIG. 4B, stream number 1 is allocated to the audio stream, stream number 2 is allocated to the image data for left eye and stream number 3 is allocated to the image data for right eye. The stream number is written in each packet header to indicate the type of data.

With this stream number, it is seen that the image for left eye is data of stream number 2 and the image for right eye is data of stream number 3 in FIG. 4A. It is noted that since the conventional multimedia information file for two-dimensional image data only distinguishes between audio and image, the information indicative of the correspondence between respective streams and respective positions of viewpoints is specific to the three-dimensional image data.

Figure 5A:
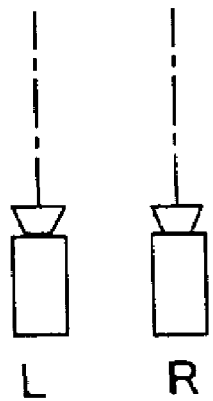
FIGS. 5A to 5C are conceptual illustrations of "the number of viewpoints" and a "viewpoint position"
Figure 5B:
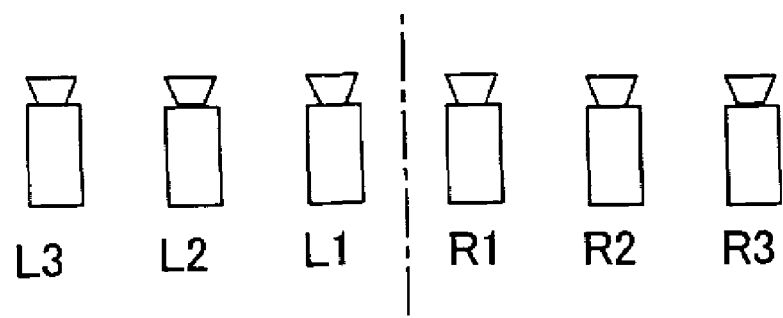
Figure 5C:
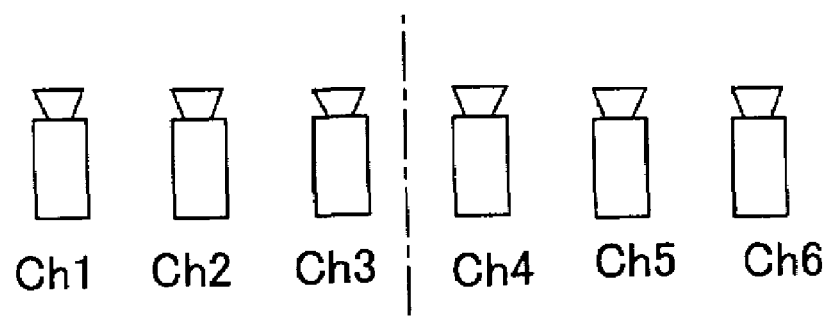

With reference to the conceptual illustrations shown in FIGS. 5A to 5C, a further description is given of the aforementioned "number of viewpoints" and "viewpoint position".

FIG. 5A shows an example of the two-viewpoint system and FIGS. 5B and 5C show respective examples of the six-viewpoint system. In the two-viewpoint system of FIG. 5A, the viewpoint position can be specified by the indication of right or left.

In the six-viewpoint system, as shown in FIG. 5B for example, the viewpoint positions on the left are indicated by "L1", "L2" and "L3" based on the ordinal position numbered from the center. The viewpoint positions on the right are indicated in the same manner.

Alternatively, in the six-viewpoint system, as shown in FIG. 5C for example, the viewpoint positions may be indicated by the serial numbers starting from the leftmost position. Further, the viewpoint positions may be indicated in any of various manners other than those shown in FIGS. 5B and 5C.

The manner in which the viewpoint position is indicated has to be shared in advance in the form of a specification or rule between the transmitter and the receiver. Without rule, it cannot be known whether the viewpoint position indicated by "ch3" for example is the third position from the left or the third position from the right.

FIG. 6 is a conceptual illustration of an exemplary manner of describing correspondence between viewpoint positions and streams in the six-viewpoint system, provided for comparison with FIG. 4A.

In FIG. 6, with an audio stream having stream number 1 allocated thereto, image streams for viewpoint positions 1 to 6 are indicated for example by stream numbers 2 to 7 respectively. The stream numbers are written in respective packet headers for indicating the type of data.

Figures 7A, 7B:
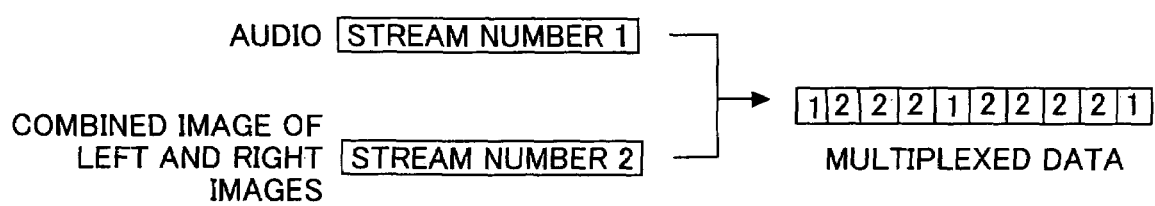
FIG. 7A is a conceptual illustration of an exemplary manner of description of a stream corresponding to a viewpoint position when an image for left eye and an image for right eye are in the same stream.
FIG. 7B shows multiplexed data.

FIGS. 7A and 7B are conceptual illustrations of an exemplary manner of describing correspondence between viewpoint positions and a stream in a case where the image for left eye and the image for right eye are in the same stream.

As shown in FIG. 7A, viewpoint position L and viewpoint position R are indicated by the same stream number (stream number 2 in this case). The multiplexed data in this case is shown in FIG. 7B. This manner of description may be employed when three-dimensional image data having a plurality of parallax images combined into a single image is recorded or transmitted.

Referring back to FIG. 4A, "direction of sub-sampling" in FIG. 4A refers to the direction in which data is sub-sampled out.

Figure 42A:
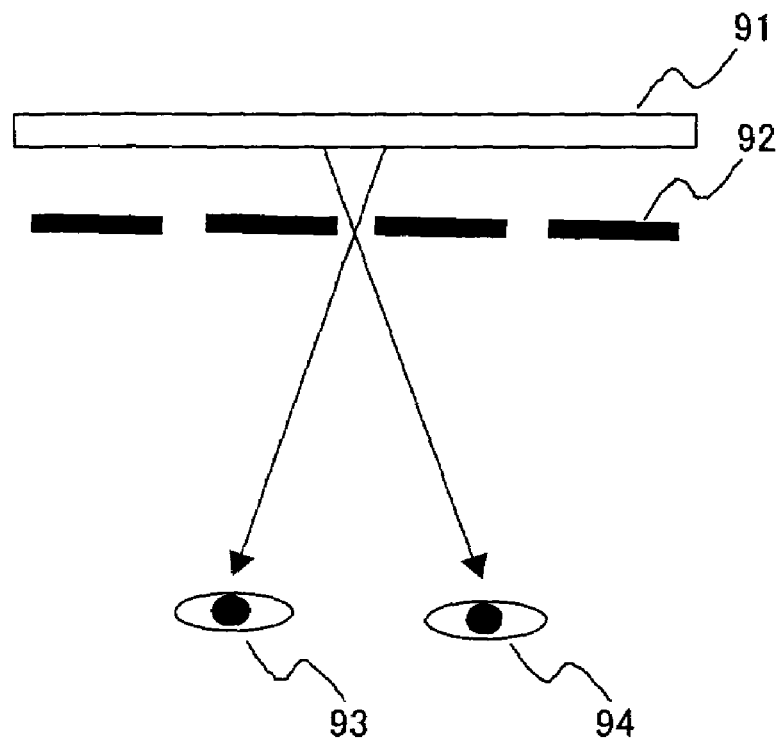
FIGS. 42A and 42B are conceptual illustrations of a "parallax barrier scheme" which is another representative of the two-viewpoint system.
Figure 42B:
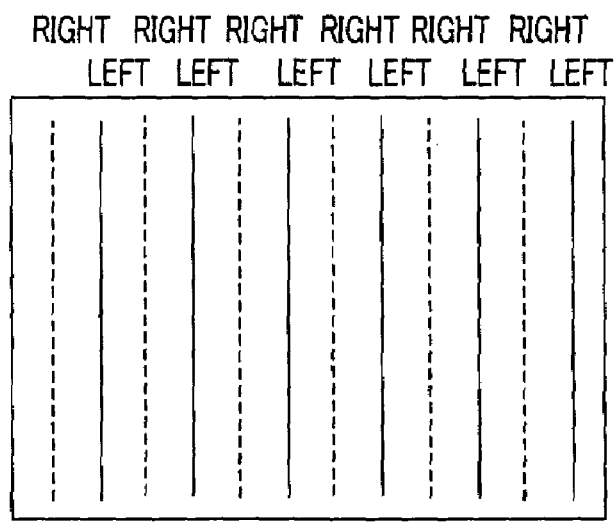

For example, when the paired images for left eye and right eye are arranged in the form of vertical stripes as shown in FIG. 42B according to "parallax barrier scheme (or lenticular scheme)" as described above, the horizontal resolution of the image for left eye and the image for right eye each is half that of a normal two-dimensional image. In this case, as "direction of sub-sampling", information that sub-sampling is done in the horizontal direction is described. This manner of description is irrelevant to whether the image for left eye and the image for right eye are provided as two streams independent of each other or as one stream of the mixed image as shown in FIG. 43C.

Figure 41:
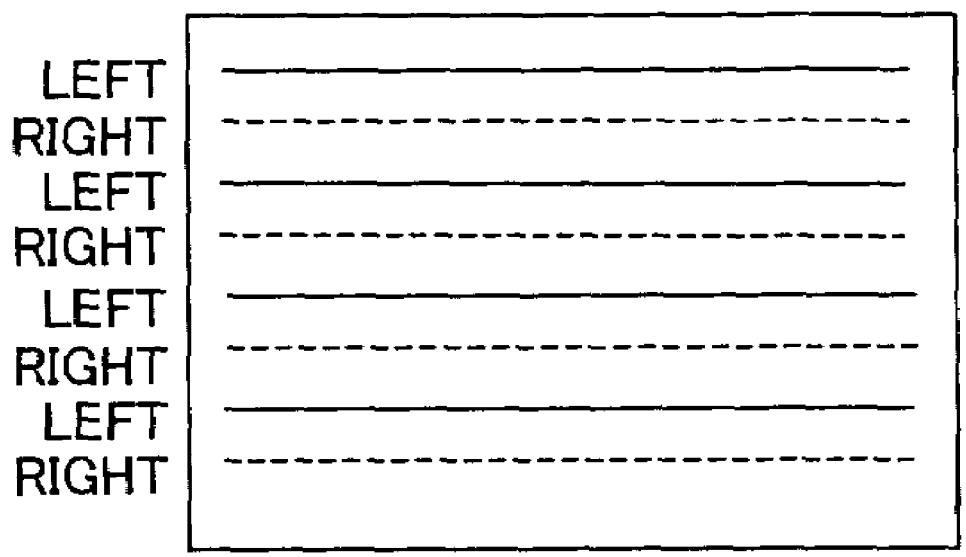
FIG. 41 is a conceptual illustration of a "time-division scheme" which is one representative of the two-viewpoint system.

The image shown in FIG. 41 described above has data sub-sampled in the vertical direction. Then, for the image as shown in FIG. 41, information that sub-sampling is done in the vertical direction is described as "direction of sub-sampling".

Figure 43A:
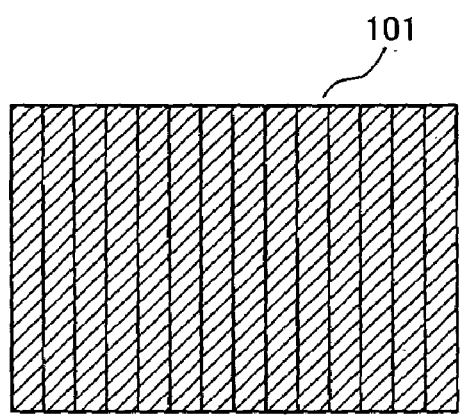
FIGS. 43A to 43C are conceptual illustrations of one example of a data recording format in accordance with a "lenticular scheme."
Figure 43B:
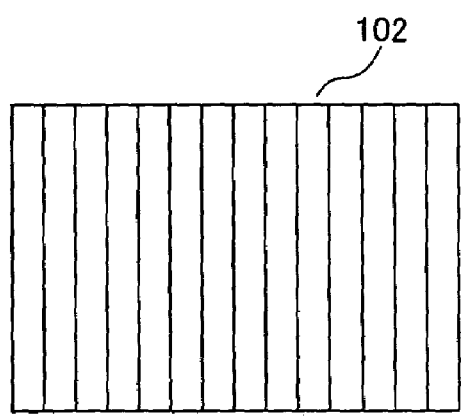
Figure 43C:
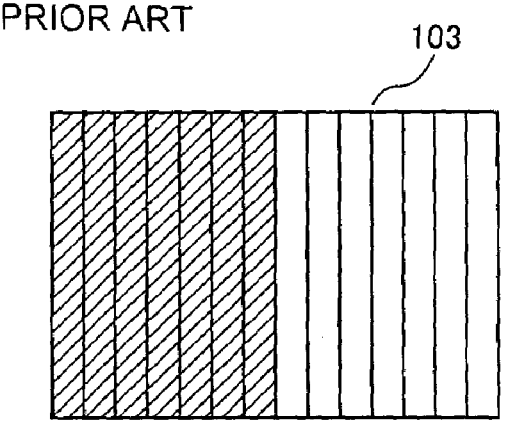

Moreover, as shown in FIGS. 43A and 43B, images without having been sub-sampled may be transmitted as they are and then sub-sampled immediately before displayed. In this case, the data recorded in the file is not sub-sampled. Then, information "no sub-sampling" is described as the information as to the direction of sub-sampling.

Such a parameter as the direction of sub-sampling is difficult to numerically indicate. Then, it is desirable to provide a table as shown in FIG. 4C for representing the direction of sub-sampling by a corresponding index defined in the table.

For example, when the direction of sub-sampling is horizontal, "1" may be indicated in the column for the direction of sub-sampling shown in FIG. 4A. In this case, the table in FIG. 4C showing the correspondence between the index and its meaning has to be shared between the transmitter and the receiver in the form of a specification or rule. This manner of indication may be applicable to other parameters.

Further, "camera arrangement" in FIG. 4A refers to how a plurality of cameras are arranged for image pick-up. The manner of arrangement is roughly classified into parallel arrangement, convergent arrangement and divergent arrangement.

The above-described FIGS. 5A to 5C show examples of the parallel arrangement in which respective optical axes of cameras are arranged in parallel.

Figure 8A:
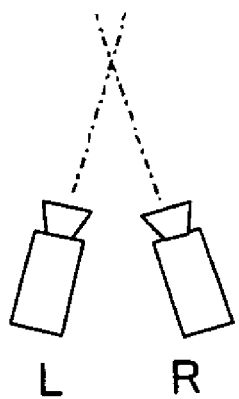
FIGS. 8A to 8C are conceptual illustrations of other examples of "camera arrangement"
Figure 8B:
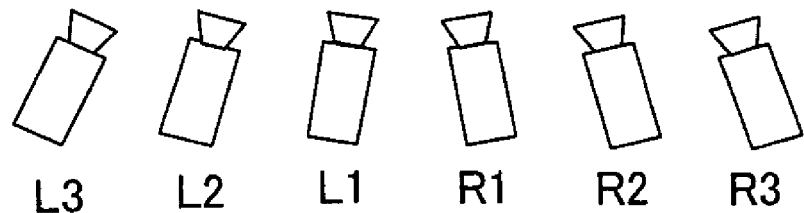
Figure 8C:
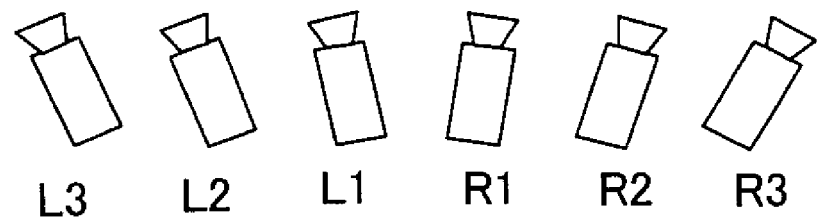

FIGS. 8A to 8C are conceptual illustrations showing other examples of "camera arrangement".

FIGS. 8A and 8B show examples of the convergent arrangement in which cameras are arranged so that respective optical axes of all the cameras converge at a certain point.

FIG. 8C shows an example of the divergent arrangement in which respective optical axes of all the cameras diverge from a certain point.

Here, FIG. 8A shows an example of the two-viewpoint system and FIGS. 8B and 8C show examples of the six-viewpoint system. This information is used in making viewpoint interpolation and constructing a three-dimensional model.

Referring again to FIG. 4A, "parallax shift limit" in FIG. 4A is described.

Generally, when a display providing a stereoscopic vision is implemented using the binocular parallax as described in connection with FIGS. 41, 42A and 42B, the feeling of depth can be adjusted by changing parallax.

Specifically, parallax can be changed for the combined image shown in FIG. 42B for example by leaving the image for left eye as it is and shifting only the image for right eye to the left or right. When the image is shifted leftward or rightward for changing parallax, a part of the combined image that corresponds to the amount of shift lies offscreen since the width of the display screen is limited. Then, the part out of the screen cannot be displayed. Therefore, if an extreme degree of shift is permitted, what a creator of the image really wants to show could not be displayed. Then, in order to avoid this situation, limitation is imposed on the amount of shift, which is herein referred to as "parallax shift limit" and is limited within a certain range like±16 pixels for example.

"Border display" in FIG. 4A refers to whether a border image is displayed or not around the three-dimensional image data. The border image is displayed for producing some variation, adding interest, or facilitating stereoscopic vision.

Figure 9A:
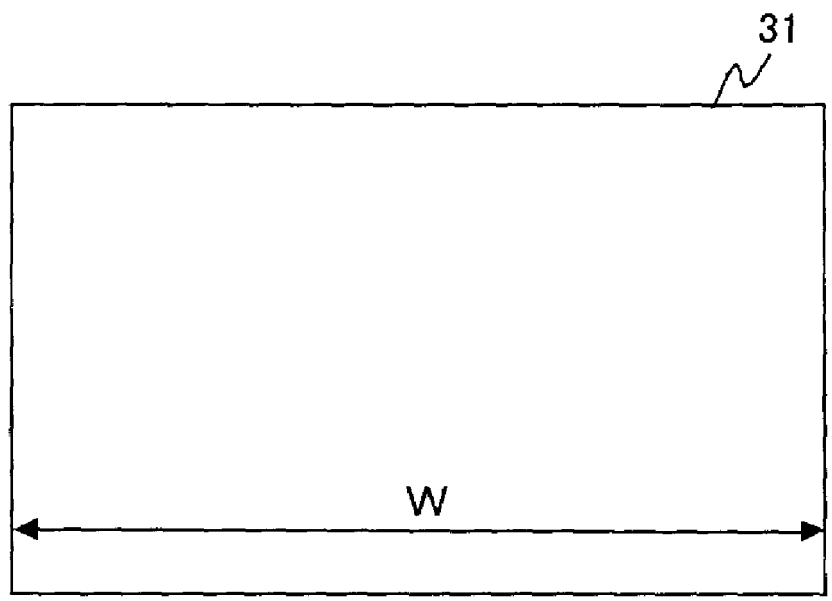
FIGS. 9A and 9B are conceptual illustrations of a structure of a border image.
Figure 9B:
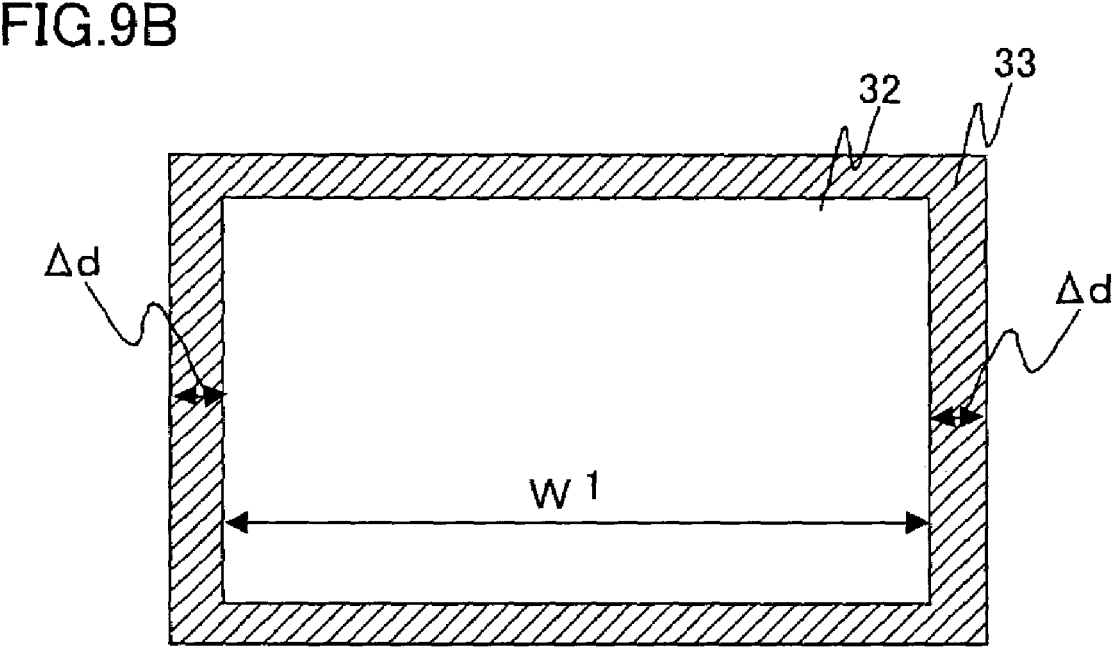

FIGS. 9A and 9B are conceptual illustrations of the structure of the border image.

FIG. 9A shows a state where no border image is displayed and the whole screen corresponds to a normal three-dimensional image display region 31 with its width indicated by W.

In contrast, FIG. 9B shows a state where the border image is displayed. While the size of the whole screen is the same as that shown in FIG. 9A, border image 33 having width Δd is displayed along the periphery of the screen and the region inside the border image is a three-dimensional image display region 32. Therefore, as compared with the three-dimensional image display region without border image, the three-dimensional image display region displayed together with the border image is smaller by the size of the border. Supposing that the width of three-dimensional image display region 32 is W1, then a relation: W=W1+2·Δd is established. Respective widths of the four parts of border image 33 along the four sides respectively of the screen may be different from each other. Border image 33 itself may be three-dimensional image providing stereoscopic vision, or two-dimensional image providing planar vision.

The border image data displayed here may be provided in advance in the reproduction apparatus or included in the multimedia information file to be transmitted together with the three-dimensional image data.

Figure 10A:
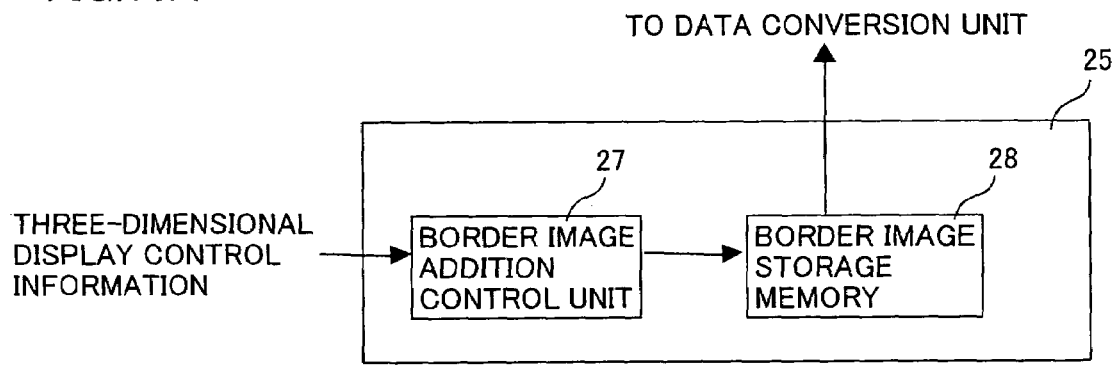
FIGS. 10A to 10C are block diagrams illustrating a configuration for supplying "border image data" for displaying the border image.
Figure 10B:
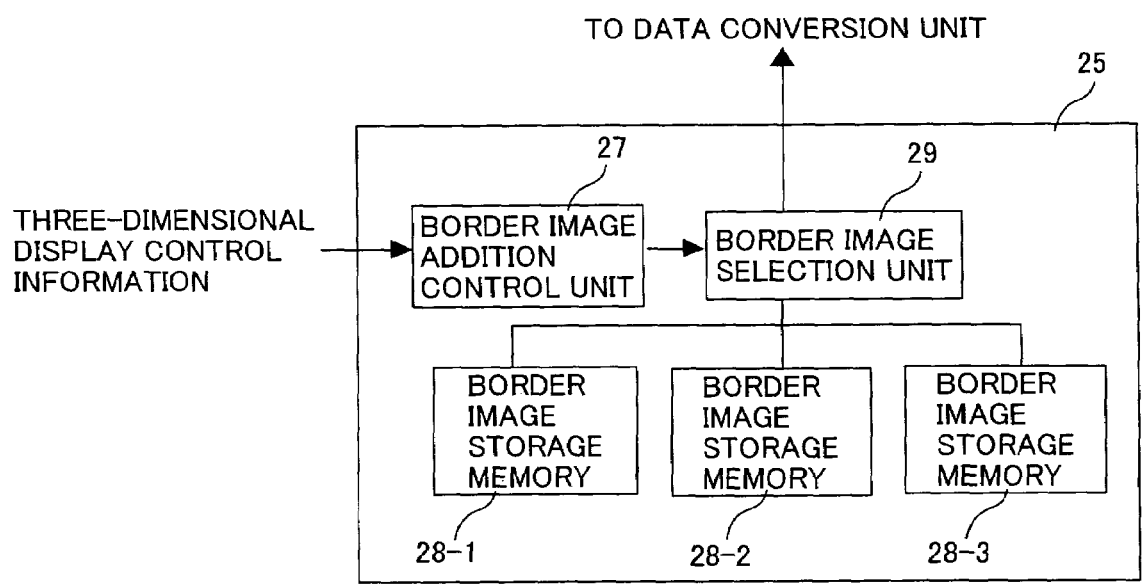
Figure 10C:
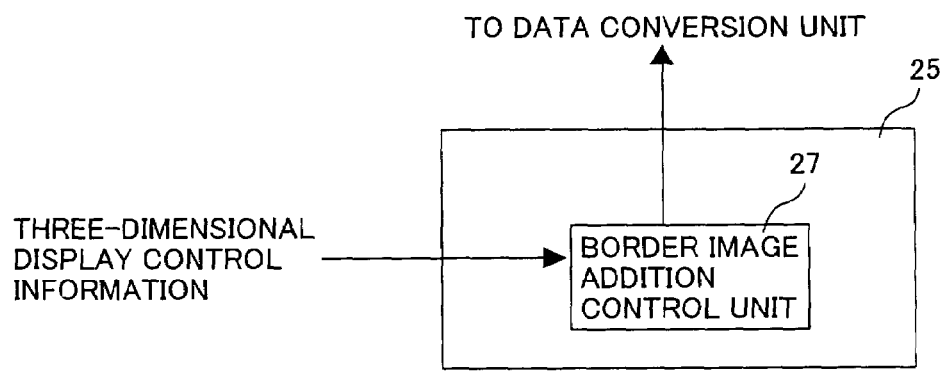

FIGS. 10A to 10C are each a block diagram illustrating a configuration for providing "border image data" to display such a border image as described above.

FIG. 10A shows an exemplary configuration used in providing in advance "border image data" in image data reproduction apparatus 200. FIG. 10A shows in more detail the configuration of three-dimensional display control information analysis unit 25 of image data reproduction apparatus 200 shown in FIG. 3.

Referring to FIG. 10A, three-dimensional display control information analysis unit 25 includes a border image addition control unit 27 and a border image storage memory 28. Border image addition control unit 27 analyzes information as to whether or not the border is displayed that is included in three-dimensional display control information input thereto. When the border image is to be displayed, the border image prepared in border image storage memory 28 is output to data conversion unit 26. Data conversion unit 26 superimposes the border image on three-dimensional image data to output the resultant image to display unit 24.

FIG. 10B is another exemplary configuration used in providing in advance the border image data in the reproduction apparatus. In other words, FIG. 10B shows details of another configuration of three-dimensional display control information analysis unit 25 of image data reproduction apparatus 200 shown in FIG. 3.

Referring to FIG. 10B, three-dimensional display control information analysis unit 25 includes a border image addition control unit 27, a border image selection unit 29 and a plurality of border image storage memories 28-1 to 28-3.

In the example shown in FIG. 10B, when border image addition control unit 27 determines that the border is to be displayed, border image selection unit 29 determines which of a plurality of prepared border images is to be used and then calls the border image data from an appropriate border image storage memory to output the called data to the data conversion unit. The information as to the border image to be used is described in the three-dimensional display control information. In the case as shown in FIG. 10B, the information may be indicated as pattern 1 and pattern 2 for example for designating an appropriate image. The border images may include border images with different textures or stereoscopic border images with different pop-up amounts. In this way, an appropriate border image can be displayed for three-dimensional image data.

A border image to be used as default image may be prepared. On the condition that the border is to be displayed while no border image data is designated or the default border image is designated, the default border image may be used. When the reproduction apparatus includes no border image pattern designated as border image data, the default image may be used instead.

In the case as shown in FIG. 10A where only one border image data is prepared, the border image data may not necessarily be designated. However, as information about border image data, "default" may be indicated.

In the cases as shown in FIGS. 10A and 10B, data about the border image is stored in image data reproduction apparatus 200 and information described in the three-dimensional display control information is selective information, namely information indicating which of one or more prepared border images is to be used.

FIG. 10C shows an example of the configuration of three-dimensional display control information analysis unit 25 of image data reproduction apparatus 200 in a case where border image data included in the multimedia information file is sent together with three-dimensional image data.

Referring to FIG. 10C, three-dimensional display control information analysis unit 25 includes a border image addition control unit 27. When border image addition control unit 27 determines that the border is to be displayed, border image data included as three-dimensional display control information is sent to data conversion unit 26. Specifically, in this example, instead of selective information, border image data itself is described as border image data information. In this way, a border image freely generated by a sender of a multimedia information file can be added.

(Other Elements of Three-Dimensional Display Control Information)

Exemplary three-dimensional display control information is mainly described below that is used when three-dimensional image data, employed in the parallax barrier scheme or lenticular scheme described above and shown in FIGS. 42A and 42B, is generated into a file.

"Parallax image switching pitch" in FIG. 4A refers to the intervals at which stripes of different parallax images are repeatedly arranged in cycles as shown in FIG. 42B.

FIGS. 11A to 11D are conceptual illustrations showing a positional relation between a liquid-crystal panel and slits of a parallax barrier used in the parallax barrier scheme.

FIGS. 11A to 11D show liquid-crystal panel 106 for displaying a three-dimensional image. Here, a unit or combination of R, G and B, indicated by 105, is called pixel and each of elements R, G and B is called sub pixel. In other words, one pixel is equal to three sub pixels.

Figure 11A:
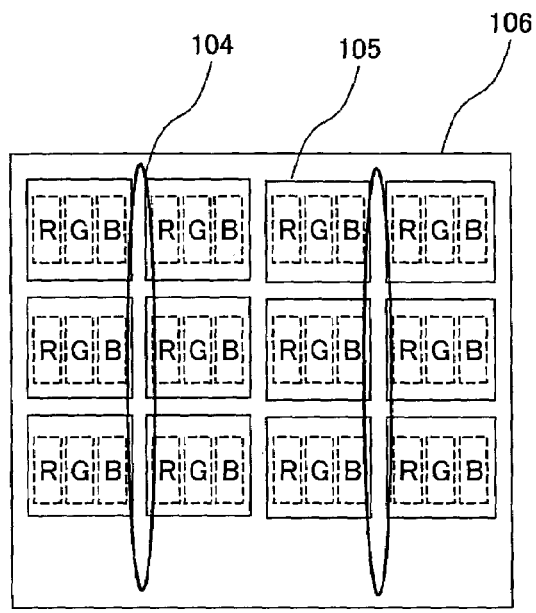
FIGS. 11A to 11D are conceptual illustrations showing a positional relation between a liquid crystal panel used in a parallax barrier scheme and slits in a parallax barrier.

In FIG. 11A, the parallax image switching pitch in the parallax barrier scheme is one pixel. In this case, one slit 104 is allocated per two pixels. FIG. 11B is a top view of FIG. 11A. As shown in FIG. 11B, an image displayed on liquid-crystal panel 106 includes images for right eye and images for left eye that are alternately arranged pixel by pixel. The distance between two slits of a parallax barrier 107 is two pixels in this case.

Figure 11C:
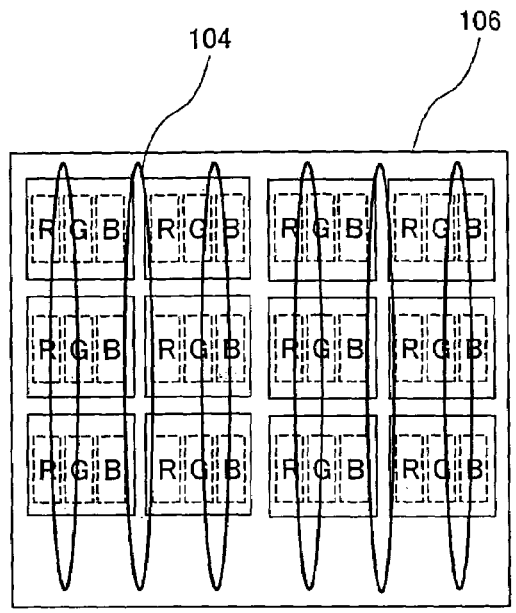
Figure 11B:
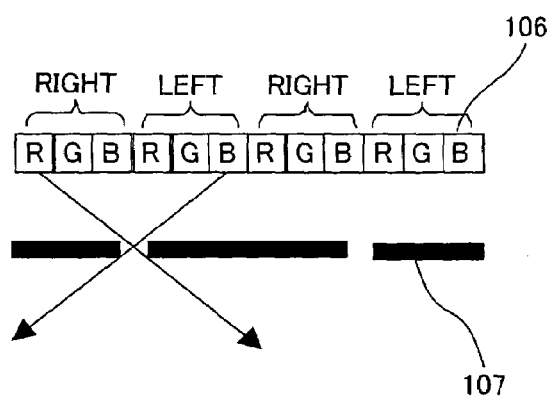
Figure 11D:
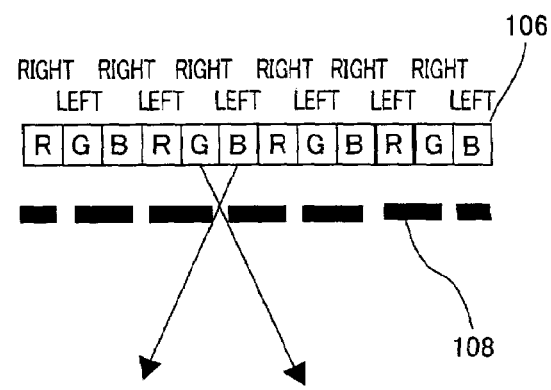

In FIG. 11C, the parallax image switching pitch in the parallax barrier scheme is one sub pixel (⅓ pixel). In this case, one slit 104 is allocated per two sub pixels. FIG. 11D is a top view of FIG. 11C. As shown in FIG. 11D, an image displayed on liquid-crystal panel 106 includes images for right eye and images for left eye that are alternately arranged sub-pixel by sub-pixel. The distance between slits of a parallax barrier 108 is two sub pixels.

"Sampling pattern" in FIG. 4A refers to a method of sub-sampling that is employed when an original image is sub-sampled in the horizontal direction to generate images for right and left eyes.

The sampling pattern includes "color-reproducibility-priority scheme" and "resolution-priority scheme".

Figure 12A:
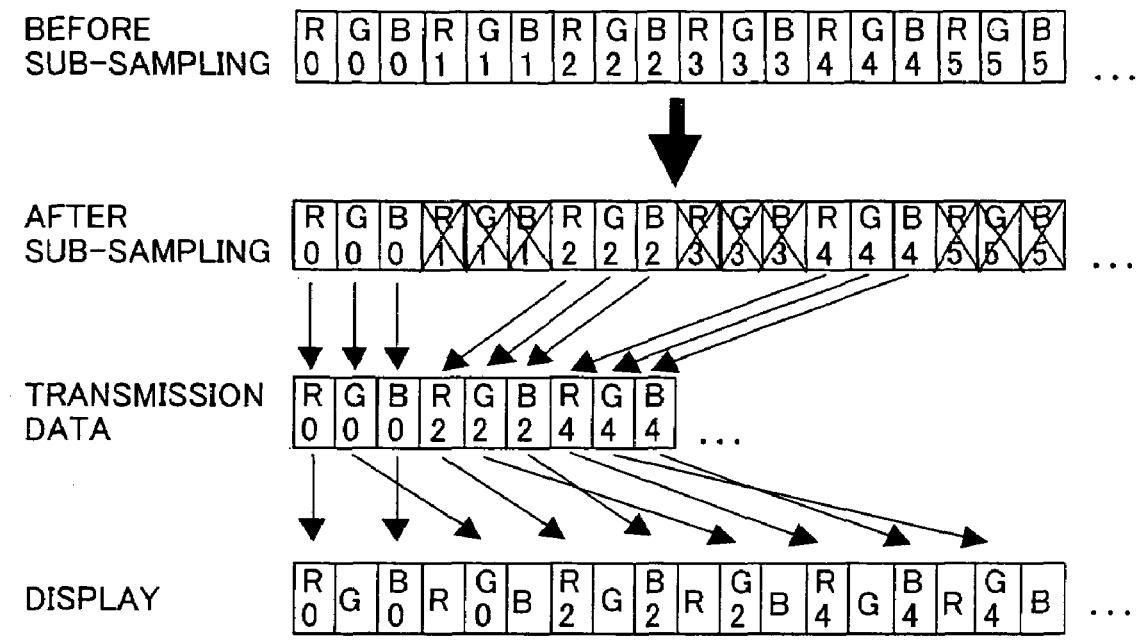
FIGS. 12A and 12B are conceptual illustrations of a sampling pattern.
Figure 12B:
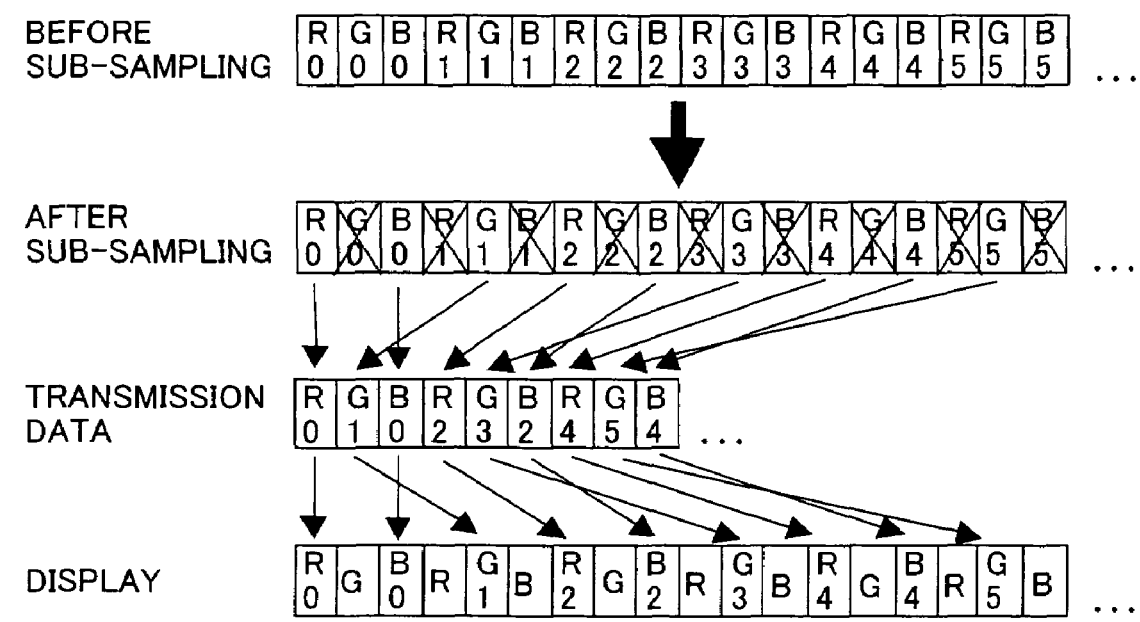

FIGS. 12A and 12B are conceptual illustrations of the sampling pattern.

FIG. 12A represents "color-reproducibility-priority scheme" and FIG. 12B represents "resolution-priority scheme".

In FIGS. 12A and 12B, image data is represented in the forms R0 and G1 for example where first letters R, G and B represent color components and the following numerals 0 and 1 for example represent the horizontal pixel position.

According to the color-reproducibility-priority scheme in FIG. 12A, data is sub-sampled by half by reducing the data pixel by pixel. The remaining data after sub-sampled through sampling at every one pixel is comprised of only the data at even-numbered positions. In this scheme, the set of remaining R, G and B is the same as that before sub-sampled, thereby providing good color reproducibility.

In contrast, according to the resolution-priority scheme in FIG. 12B, data is sub-sampled by half by reducing the data sub-pixel by sub-pixel. After sub-sampled, data at pixel position 0 is only of R and B components while data at pixel position 1 is only of G component. As compared with data before sub-sampled, data after sub-sampled includes no pixel with the same set of R, G and B. However, in the data after sub-sampled, data at all pixel positions is included for at least one color component. Therefore, the perceived resolution is high. Then, for example, diagonal jaggy lines are somewhat imperceptible.

It is noted that the resolution-priority scheme in FIG. 12B is effected on the precondition that the parallax image switching pitch is on the basis of sub pixel, and thus only the color-reproducibility-priority scheme in FIG. 12A can be selected in principle when the parallax image switching pitch is one pixel as shown in FIG. 11A.

By recording the information on the sampling pattern as the three-dimensional display control information, if the sampling pattern of the three-dimensional image data recorded in the multimedia information file is different from the sampling pattern of the display device in the image data reproduction apparatus, erroneous display can be avoided. If the sampling patterns are different from each other as described above, three-dimensional display may be achieved by automatically converting the sampling pattern in the image data reproduction apparatus, for example. Alternatively, if switching between three-dimensional display and two-dimensional display is allowed, display may be achieved by switching to two-dimensional display. Alternatively, an indication that the three-dimensional image data is different from the sampling pattern of the display device or an indication that the three-dimensional image data is not reproducible may be shown.

"Image arrangement" in FIG. 4A refers to information that is required when a plurality of parallax images are arranged to constitute one image as shown in FIG. 43C and the resultant image is transmitted and recorded.

FIGS. 13A to 13E are conceptual illustrations of image arrangement for arranging a plurality of parallax images into one image.

When an image for left eye and an image for right eye after horizontal sub-sampling are arranged side by side to constitute one image, an arrangement is the one as shown in FIG.

Figure 13A:
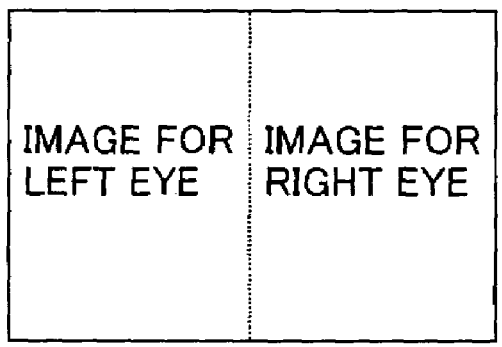
FIGS. 13A to 13E are conceptual illustrations of image arrangement in which a plurality of parallax images are arranged for forming one image.
Figure 13B:
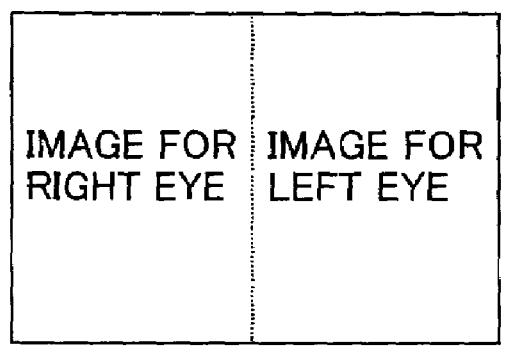

13A having the image for left eye on the left and the image for right eye on the right. Another arrangement may be the one as shown in FIG. 13B having the left image for left eye on the right and the image for right eye on the left.

Figure 13C:
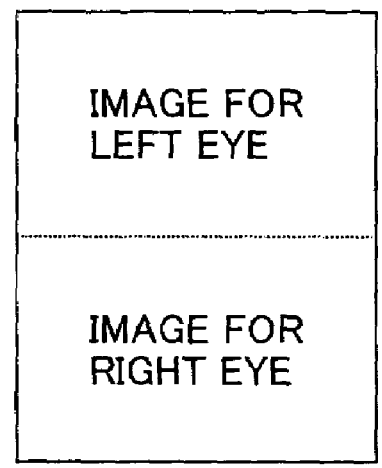
Figure 13D:
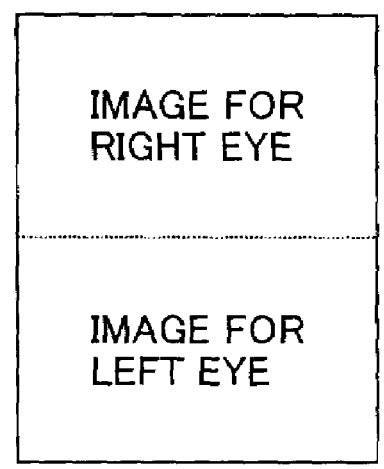

When an image for left eye and an image for right eye after vertically sub-sampled are arranged in the vertical direction to constitute one image, the images may be arranged as shown in FIG. 13C with the image for left eye on the top of the image for right eye or arranged as shown in FIG. 13D with the image for left eye under the bottom of the image for right eye.

Accordingly, information as to whether a plurality of parallax images are arranged side by side or vertically and information as to whether the image for left eye is on the left or right or on the top or bottom is described to identify the way of arrangement and the positional relation. It is noted that the number of viewpoints (number of parallax images) is not limited to two.

Figure 13E:
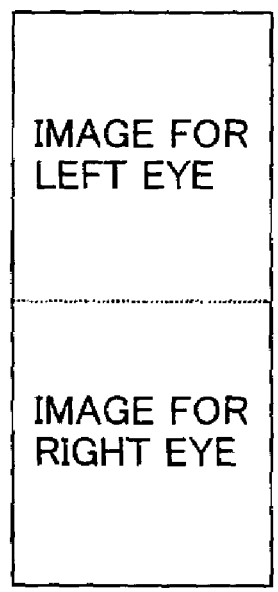

The direction of sub-sampling and the direction in which images are arranged may be taken independently of each other. Specifically, images after horizontally sub-sampled may be arranged vertically as shown in FIG. 13E. In contrast, the direction of sub-sampling and the direction in which images are arranged may be the same so that one of the information as to the way of arrangement and the information as to the positional information may be dispensed with.

Further, the information as to the direction of sub-sampling as described above may be indicated separately for the image for left eye and the image for right eye. In the exemplary three-dimensional display control information shown in FIG. 14A, the direction of sub-sampling for left eye image is indicated as "no sub-sampling" while the direction of sub-sampling for right eye image is indicated as "horizontal". In this case, the image for left eye and the image for right eye arranged side by side is the one as shown in FIG. 14B having the image for left eye and the image for right eye that are different in size. In this manner, good image reproduction can be accomplished for both of an image data reproduction apparatus having a display unit that can display only two-dimensional images and an image data reproduction apparatus having a display unit that can display three-dimensional images in addition to two-dimensional images. Specifically, when the image data reproduction apparatus capable of displaying two-dimensional images only receives the image data shown in FIG. 14B, the apparatus can display only the image for left eye that has not been sub-sampled and thus provide high resolution. When the image data reproduction apparatus capable of displaying three-dimensional images receives the image data shown in FIG. 14B, the reproduction apparatus can horizontally sub-sample the image for left eye to make the left-eye image identical in resolution to the image for right eye and then make data conversion for providing three-dimensional display, so that the three-dimensional display similar to that obtained when the image data as shown in FIG. 13A is received can be accomplished.

"Reversal" in FIG. 4A refers to whether each of a plurality of parallax images arranged to constitute one image is reversed or not.

Figure 15A:
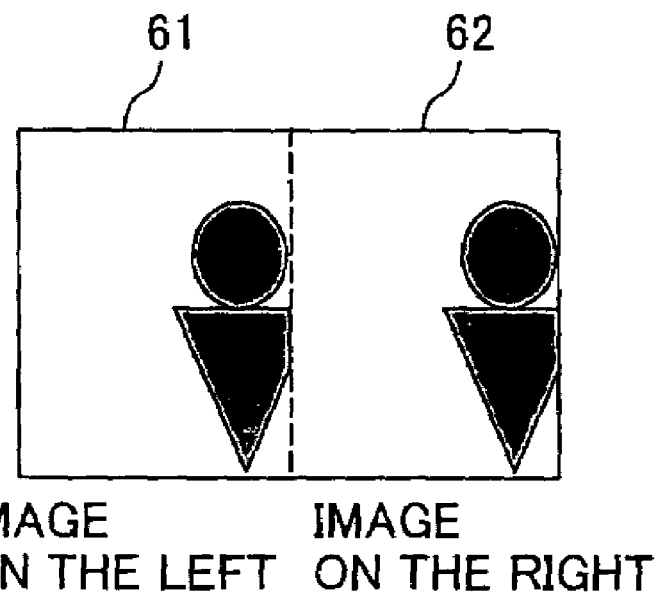
FIGS. 15A and 15B are conceptual illustrations of a manner of reversal of each parallax image.
Figure 15B:
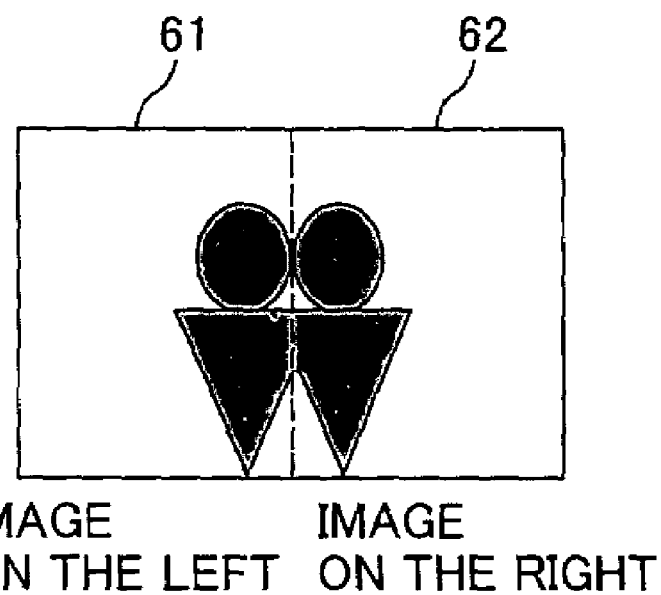

FIGS. 15A and 15B are conceptual illustrations of a manner of reversal of each parallax image.

In FIG. 15A, an image for left eye 61 and an image for right eye 62 are simply arranged on the left and right respectively. When image for right eye 62 is reversed in the horizontal direction, the resultant arrangement is the one as shown in FIG. 15B. When an image is encoded to be recorded and transmitted, the image including regions having similar features that are located relatively closer to each other is encoded at higher encoding efficiency in some cases. In some cases, therefore, the image in FIG. 15B is encoded at higher encoding efficiency than the image in FIG. 15A. When the arrangement as shown in FIG. 15B is employed, reproduction apparatus 200 has to reverse the image for right eye again to set the right-eye image in the original state.

When two parallax images are arranged side by side, the manner of reversal may include "no reversal", "reverse left image", "reverse right image" and "reverse both images". Here, "left image" is defined as the left one of the two images arranged side by side. Therefore, when the arrangement in FIG. 13A is employed, the left image refers to the image for left eye. Further, when the arrangement in FIG. 13B is employed, the left image refers to the image for right eye. It is noted that the indication may be "reverse image for left eye" instead of "reverse left image" since the information as to the image arrangement as described above can be used to know on which of the left and right the image for left eye is located.

(Image-Pickup Condition Information)

As shown in FIG. 16, the multimedia information file may also include image pick-up condition information 42 in addition to three-dimensional display control information 2.

Here, it is assumed that the data relevant to such an image pick-up condition is provided to three-dimensional display control information generation unit 11 as a part of a parameter in the structure of image data recording apparatus 100 shown in FIG. 2, for example. Here, if the data relevant to the image pick-up condition is provided as a parameter, three-dimensional display control information generation unit 11 encodes the data relevant to the image pick-up condition in addition to three-dimensional display control information 2 described above so as to generate image pick-up condition information 42 which will be described later, and provides the generated information to file generation unit 12. File generation unit 12 generates a multimedia information file including both of image pick-up condition information 42 and three-dimensional image data 3 or at least one of the three-dimensional image data or the two-dimensional image data in addition to three-dimensional display control information 2, in accordance with information contained in the data provided as the parameter.

FIG. 17 shows one example of specific information described in image pick-up condition information 42. The number of viewpoints and the camera arrangement in FIG. 17 have also been described in the three-dimensional display control information shown in FIG. 4A. Some information may be described in three-dimensional display control information and in the image pick-up condition information in a duplicated manner, or may be described in either one of them.

FIG. 17 shows an example in which the number of viewpoints is set to 2. If two cameras are arranged and images from two viewpoints are picked up as shown in FIG. 5A, information specific to respective cameras (specific parameter) is described separately. Examples of the specific parameter include focal length of a lens, F number, exposure, shutter speed, diaphragm stop, gain, white balance, focusing, zoom ratio, gamma value, and the like. If two cameras have the same characteristics, the specific parameters may be summarized to one, on the assumption that a person can know that such information is used commonly in both cameras. For example, if solely a single set of the specific parameter is described in the image pick-up condition information, such a rule that the specific parameter is applicable to cameras at all viewpoints may be set in advance.

Image pick-up condition information 42 also includes an external parameter indicating a positional relation among cameras. More specifically, such an external parameter includes representation of a camera position at viewpoint position R in a three-dimensional coordinate form using the camera at viewpoint position L as a reference (described in a unit of mm in FIG. 17), a convergence angle, or the like. If the optical axes of the cameras are arranged in parallel, the convergence angle is set to 0 degree.

The image pick-up condition information is used for knowing identity of data for performing an appropriate processing thereon when the picked-up three-dimensional image data is subsequently edited and processed. In addition, the image pick-up condition information can effectively be used for viewpoint interpolation and three-dimensional model construction.

Meanwhile, in order to obtain images from two viewpoints, a camera adapter 71 as shown in FIG. 18 may be attached in front of a camera lens for image pick-up. In FIG. 18, a solid line represents a mirror (solely inside the adapter), and a dotted line represents an aperture. The inside of camera adapter 71 is implemented as a mirror, and serves to contain light beams incident on different viewpoints (shown with a dashed line in FIG. 18) in a range of camera lens diameter. That is, by attaching camera adapter 71, it can be assumed that two cameras are virtually used. An image picked up here is such that left half represents an image at viewpoint position L and right half represents an image at viewpoint position R.

FIG. 19 shows an example of image pick-up condition information 42 added when an image is picked up using the camera adapter. As information specific to the camera adapter, information such as an adapter manufacturer, an adapter type, an adapter model, and the like is described. As to the adapter type, a type such as a mirror type, a prism type, or the like is described. In addition, an angle of view (field of view) per one viewpoint may be described. The external parameter can be described also when the camera adapter is used, as in FIG. 17. In FIG. 19, a mutual relation between two viewpoint positions is represented by a base length and a convergence angle.

Figure 20:
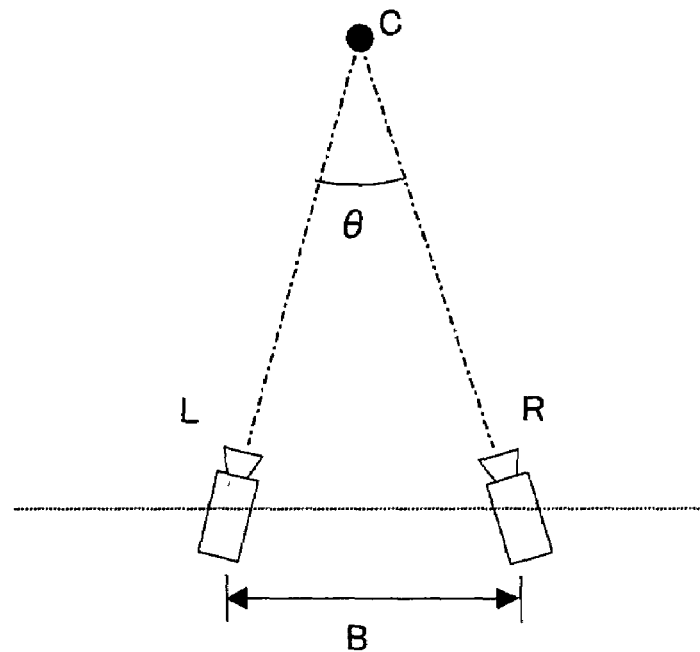
FIG. 20 illustrates a base length and a convergence angle.

The base length is denoted by a distance B in FIG. 20, and the convergence angle is denoted by θ. A point C in FIG. 20 represents a point of intersection of the optical axis of the camera at viewpoint position L and the optical axis of the camera at viewpoint position R, that is, the convergence point. In the case of camera adapter 71 in FIG. 18, a distance between respective centers in left and right apertures, that is, distance B shown in FIG. 18, is comparable to the base length.

FIG. 19 further shows a pop-up direction and a stereo intensity.

Here, the "pop-up direction" refers to information indicating whether a subject included in an image is located in front of or behind the convergence point, and is selected from three types of "pop-up only", "retraction only", and "both". That is, if all subjects are present in front of the convergence point, "pop-up only" is to be selected. If all subjects are present behind the convergence point, "retraction only" is to be selected. In addition, if the subjects are present both in front of and behind the convergence point, "both" is to be selected.

The "pop-up direction" does not have to be determined necessarily based on arrangement of all subjects, and it may be determined based on an arrangement of a main subject. In other words, if a portion of the main subject projects from the convergence point, "pop-up" may be described. In contrast, if the main subject is present behind the convergence point, "retraction" may be described. Here, selection is to be made from two types of information, i.e., "pop-up" and "retraction".

The "stereo intensity" refers to an index indicating a degree of three-dimensional appearance. A three-dimensional image has parallax, and an observer perceives stereopsis by virtue of parallax. Though parallax among pixels in the three-dimensional image is different, for example, stereo intensity of the three-dimensional image including a number of pixels having large parallax is strong, while stereo intensity of the three-dimensional image including few pixels having large parallax is weak. Accordingly, the stereo intensity may be determined objectively based on an average value of the parallax for each pixel (an average value in a whole screen in a case of a still picture, and an average value in a whole moving picture in a case of a moving picture), or may be determined based on subjective evaluation. Alternatively, the stereo intensity may be determined based on a weighted average of both of the above. As an objective evaluation value, a weighted average, a median, a maximum value, or the like may be used instead of the average value. In the case of a moving picture, a maximum value for each frame is found, and an average value, a median, a maximum value, or the like of the maximum values across all frames may be employed as the objective evaluation value. Information such as the "pop-up direction" and the "stereo intensity" can be utilized in retrieving three-dimensional image contents.

Though the example in which the number of viewpoints is set to two has been described with reference to FIGS. 17 and 19, a positional relation among cameras can be described using the same concept even when the number of viewpoints is set to three or more. That is, in a description method as in FIG. 17, any one camera serves as the reference, and as to other cameras, a position relative to the reference camera is described on three-dimensional coordinates for each camera. The convergence angle is described for every two adjacent cameras. For example, if the number of viewpoints is set to N, (N−1) pieces of information indicating the convergence angle are described. The base length in the description method as in FIG. 19 may also be described for every two adjacent cameras. That is, in this case as well, if the number of viewpoints is set to N. (N−1) pieces of information indicating the base length are described.

Though the example in which the camera arrangement is described by expressing the number of viewpoints=2, camera arrangement=convergent type, base length=50 mm, and convergence angle=30 degree has been described in connection with FIG. 19, information related to the camera arrangement can be described using another method, which will be described later. When an attempt to obtain what is called stereoscopic vision is made, a camera arrangement of a convergent type or a parallel type described above is used. Therefore, the description below is premised on such a camera arrangement.

Figure 21:
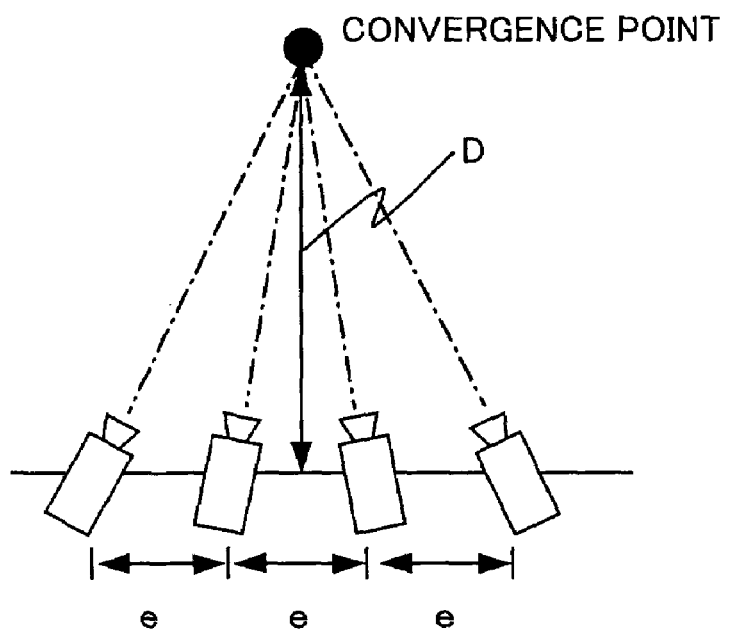
FIG. 21 is a conceptual illustration of a camera arrangement shape when cameras are arranged linearly in image pick-up in accordance with a two-viewpoint system or a multi-viewpoint system.

When a plurality of cameras are arranged for image pick-up in accordance with the two-viewpoint system or the multi-viewpoint system (when the number of viewpoints is set to 3 or more), noting to a camera arrangement shape, the camera arrangement is broadly categorized into a linear arrangement as shown in FIG. 21 and an annular arrangement as shown in FIG. 22.

In the example of FIG. 21, a plurality of (four) cameras are arranged on one straight line, and intervals between respective cameras are set equally to e. FIG. 23 shows exemplary image pick-up condition information in such an example. Here, the camera arrangement shape is described as "linear" or "annular". In the example of FIG. 23, the camera arrangement shape is described as "linear", and an interval between the cameras is set to 70 mm. The cameras are arranged such that the optical axes of respective cameras intersect on one point (convergence point), and a distance D from a line on which the cameras are arranged to the intersection is described as a "distance to the convergence point." In the example of FIG. 23, the distance to the convergence point is set to 100 cm. If distance D to the convergence point is set to a finite value, the camera arrangement is assumed as the convergent type. If the cameras are arranged in parallel, distance D to the convergence point can be described as infinite.

In the example of FIG. 22, a plurality of (four) cameras are arranged on an identical circumference, and intervals between respective cameras are set equally to e. If the optical axes of respective cameras intersect on the center of a circle, this means that the center point and the convergence point coincide. In the example of the annular arrangement, a radius r of the circle is described as the distance to the convergence point. In addition, if the intervals between the cameras are equal, a central angle θ between respective cameras is also equal. Therefore, instead of the interval between the cameras, an angle between the cameras (convergence angle) may be described.

When a plurality of cameras are arranged, the cameras may freely be arranged without limitation on the arrangement shape such as linear or annular, such that the intervals between the cameras are not equal. Considering actual use of the picked-up image, however, it is reasonable to employ the linear or annular arrangement shape as well as to employ equal interval arrangement. In doing so, the camera arrangement can efficiently be described by employing three parameters of the camera arrangement shape, the distance to the convergence point and the interval between the cameras.

Figure 24:
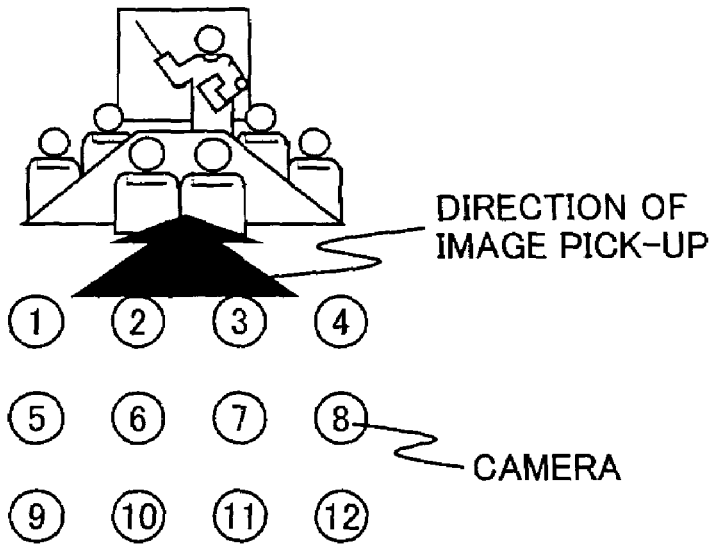
FIG. 24 is a conceptual illustration of a camera arrangement shape when the cameras are arranged in a form of lattice.

So far, the example in which the cameras are arranged in a horizontal direction has been described. As shown in FIG. 24, however, the cameras may be arranged in both a horizontal direction and a direction perpendicular thereto, that is, in a form of lattice. In this manner, not only parallel parallax but also perpendicular parallax can be recorded. Such a camera arrangement is employed, for example, in a three-dimensional technology called integral photography.

Figure 25:
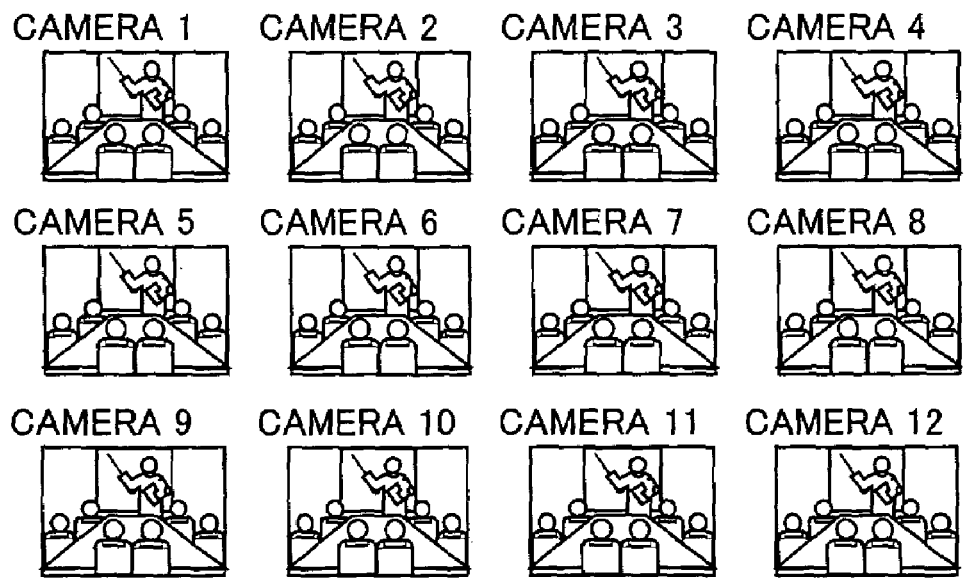
FIG. 25 shows an image obtained from each camera when the cameras are arranged in a form of lattice.

FIG. 24 shows an example in which four rows of cameras in the horizontal direction and three rows of cameras in the direction perpendicular thereto, i.e., a total of twelve cameras, are arranged. Numbering the twelve cameras from upper left to lower right in the order of raster, a total of twelve images can be obtained from respective cameras, as shown in FIG. 25.

FIGS. 13A to 13E have shown the example in which two images are arranged side by side or vertically. When the cameras are arranged in a form of lattice as shown in FIG. 24, the images can also be arranged in a form of lattice as shown in FIG. 26. In this case, information on the image arrangement shown in FIG. 4A should be described as "arrangement in a form of lattice."

When the cameras are arranged in a form of lattice as shown in FIG. 24, simply describing the number of viewpoints does not serve to show how many rows are present in the horizontal and perpendicular directions respectively. Therefore, in such a case, as shown in FIG. 27, the number of viewpoints in the horizontal direction and the number of viewpoints in the perpendicular direction are desirably described separately as the image pick-up condition information. Here, the total number of viewpoints is obtained by multiplying the number of viewpoints in the horizontal direction by the number of viewpoints in the perpendicular direction. Though FIG. 27 exemplarily shows the image pick-up condition information, this is also the case with regard to the three-dimensional display control information.

In addition, though the camera arrangement shape has previously been described as linear or annular, the camera arrangement is expanded to planar arrangement and spherical arrangement when the cameras are arranged also in the perpendicular direction as shown in FIG. 24. In this case as well, an interval between the cameras and a distance to the convergence point can be defined in a manner the same as in the case of the linear or annular arrangement.

All items for the "three-dimensional image display control information" as described above are not essential for the multimedia information file, and some may not be provided as necessary. In such a case, it is only necessary to show which item is described.

(Three-Dimension Identification Information)

The object ID in FIG. 4A indicates start of a unit of an information object from this position, and also indicates that this information object relates to the three-dimensional display control information. That is, such an object ID also attains a function as three-dimension identification information indicating that the multimedia information file includes the three-dimensional image control information, that is, three-dimensional image data.

On the other hand, as shown in FIG. 28, a versatile ID may be used as an object ID in the three-dimensional image control information object. Here, this ID merely indicates start of a unit of an information object from this position, and information indicating what kind of information is written in the information object is separately provided in the object.

In FIG. 28, three-dimension identification information 3D-001 is written as information indicating that this information object relates to three-dimensional display control information. Here, 3D-001 shows only a single example, and any numeral or character string may be used as the three-dimension identification information.

In the example above, the three-dimension identification information is used in order to indicate that the three-dimensional image data is included. Different three-dimensional display schemes can be distinguished from one another by providing different three-dimension identification information thereto. For example, 3D-001 may be given to data for the parallax barrier scheme, while 3D-002 may be given to data for a liquid crystal shutter scheme.

In addition, the three-dimension identification information alone may form one information object, as shown in FIG. 29. Here, the multimedia information file may hold three-dimension identification information 41 and three-dimensional display control information 2 as separate objects, as shown in FIG. 30.

Figure 30:
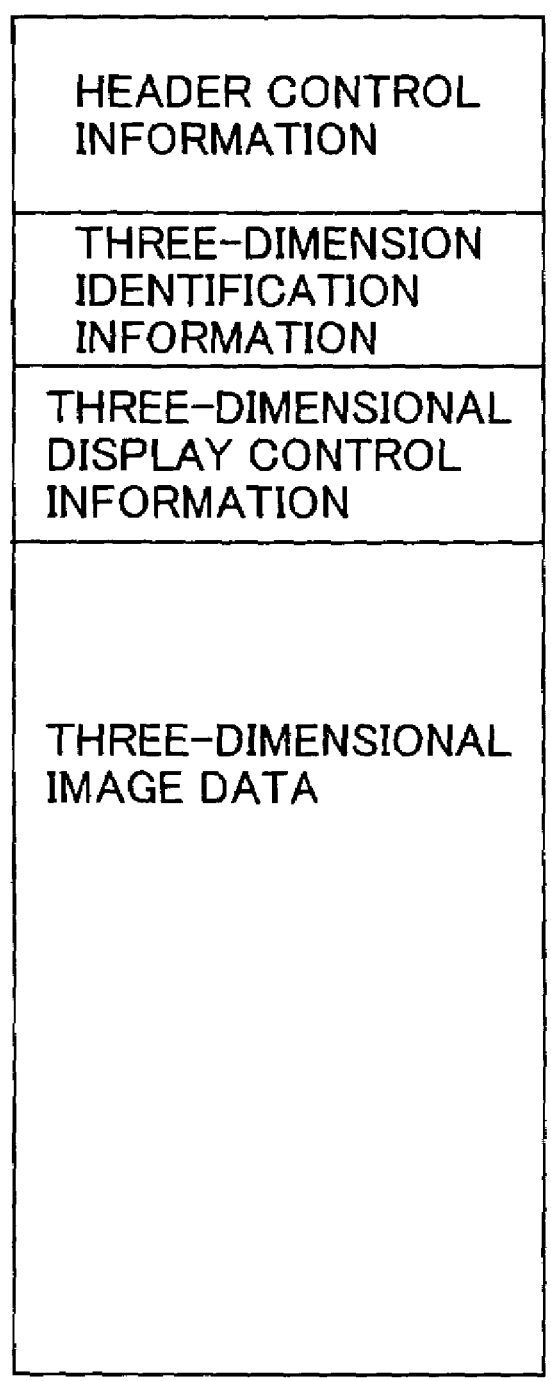
FIG. 30 shows a structure of a multimedia information file.

In the example shown in FIG. 30, though header control information 1, three-dimension identification information 41, three-dimensional display control information 2, and three-dimensional image data 3 are recorded in this order, the order of recording is not limited thereto. For example, if three-dimension identification information 41 is recorded at the beginning of the file, whether or not the multimedia information file contains the three-dimensional image data can quickly be determined. In addition, in FIG. 30, though three-dimension identification information 41 and three-dimensional display control information 2 are provided as objects separate from header control information 1, such information may be provided in header control information 1.

In order to indicate that the multimedia information file contains the three-dimensional image data, a dedicated extension can be employed instead of the three-dimension identification information. For example, when an extension "jpg" is used for the multimedia information file containing normal two-dimensional image data, an extension "3da" is used for the multimedia information file containing three-dimensional image data. Then, whether or not the multimedia information file contains the three-dimensional image data can be identified based on the extension. In addition, different three-dimensional display schemes can be distinguished from one another by providing different extensions thereto. For example, the extension "3da" is used for the multimedia information file containing data for the parallax barrier scheme, while an extension "3db" is used for the multimedia information file containing data for the liquid crystal shutter scheme.

An advantage of three-dimension identification based on the extension resides in ability of determining whether or not a file contains three-dimensional image data or to which three-dimensional display scheme the contained data is adapted, without analyzing file contents. For example, when a number of multimedia information files are present on a hard disk, which file is reproducible in one's own terminal can quickly be found. Alternatively, when a plurality of multimedia information files are present on a server, a terminal only capable of reproduction of a two-dimensional image can be prevented from downloading a three-dimensional image.

On the other hand, when three-dimension identification is performed based on the three-dimension identification information described previously, the three-dimension identification information is stored until file contents are rewritten. Therefore, it is an advantage that the three-dimension identification information representing important information is not readily changed.

A method of recording the three-dimension identification information is not limited to recording in the file or using the extension. The three-dimension identification information represents important information indicating whether the image data contained in the multimedia information file is the three-dimensional image data or the two-dimensional image data. Therefore, reliability of the information can be enhanced by employing both recording in the file and using the extension.

Figure 31:
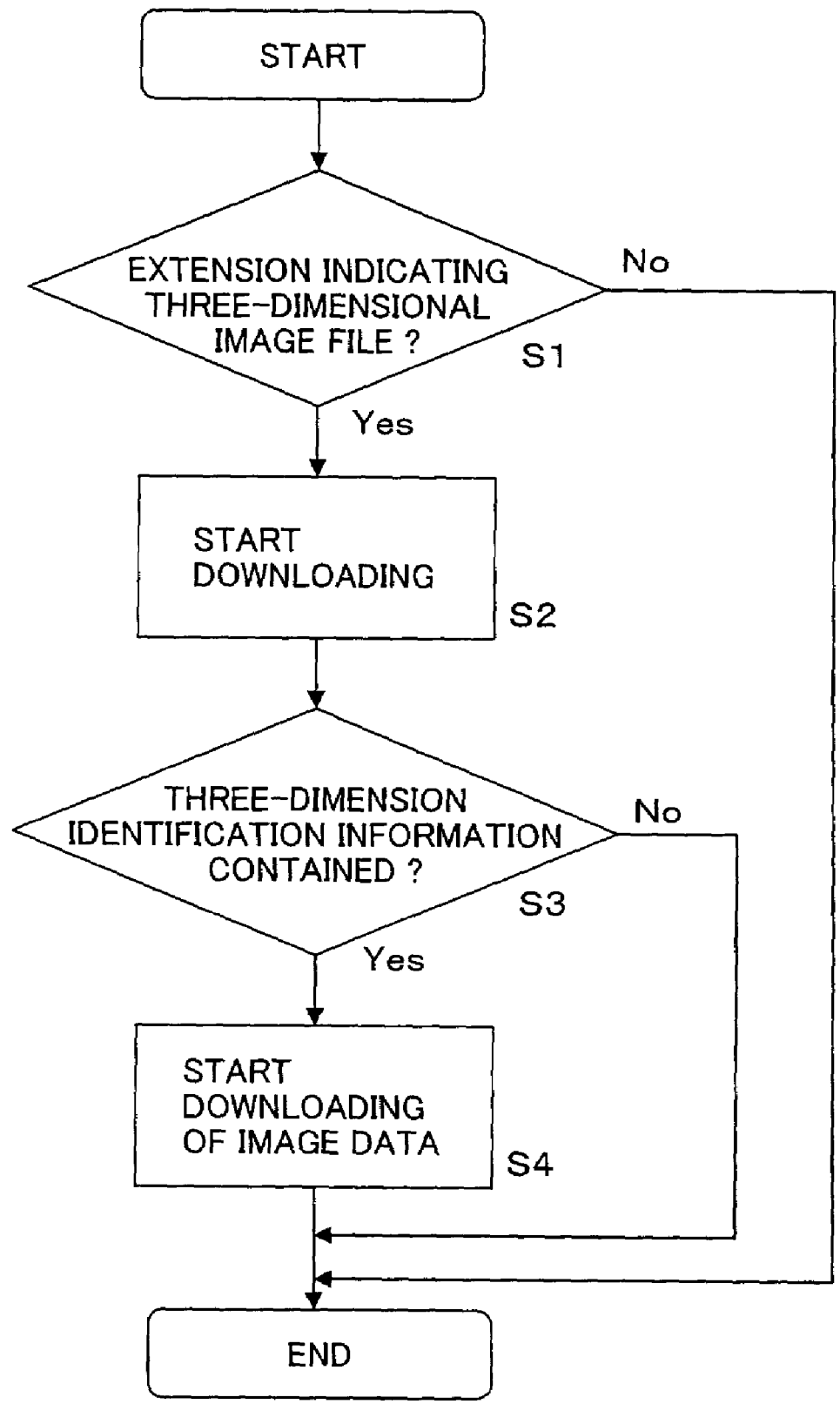
FIG. 31 is a flowchart illustrating a process for downloading a three-dimensional image file.

FIG. 31 is a flowchart illustrating a process for downloading a three-dimensional image file.

For example, when a plurality of multimedia information files are present on a server and when a file of the two-dimensional image data and a file of the three-dimensional image data are present in a mixed manner, whether or not downloading is to be performed is determined according to a method as shown in FIG. 31.

At step S1 in FIG. 31, whether or not a file name of a file to be downloaded includes an extension indicating a three-dimensional image file is determined. If the extension indicating the three-dimensional image file is included (Yes), the process proceeds to step S2. If the extension indicating the three-dimensional image file is not included (No), downloading is aborted and the process ends.

At step S2, downloading of the file is started. At step S3, whether or not three-dimension identification information is contained at a prescribed position in the file is determined. If the three-dimension identification information is contained (Yes), the process proceeds to step S4 and downloading of the image data is continued. If the three-dimension identification information is not contained (No), downloading is aborted and the process ends.

As described above, in downloading, initially, whether or not the file is the three-dimensional image file is determined based on the extension. Accordingly, whether or not downloading is to be started can readily been determined. The extension can easily be changed through a process to change the file name. Therefore, in order to enhance reliability, whether or not downloading of the image data is to be continued is determined based on the three-dimension identification information in the file. Such a method is effective in a case where a file size of an image is large and downloading of the same is time-consuming, or in a case where communication charge is expensive and only a desired file is to be downloaded.

(Another Structure 1 of Image Data Reproduction Apparatus)

A display unit capable of switching between two-dimensional display and three-dimensional display can be employed as a display for showing an image. That is, a display unit 44 in the image data reproduction apparatus shown in FIG. 32 attains a display-mode switching function between the two-dimensional display and the three-dimensional display. The display unit may be implemented by display means capable of automatic switching.

Figure 32:
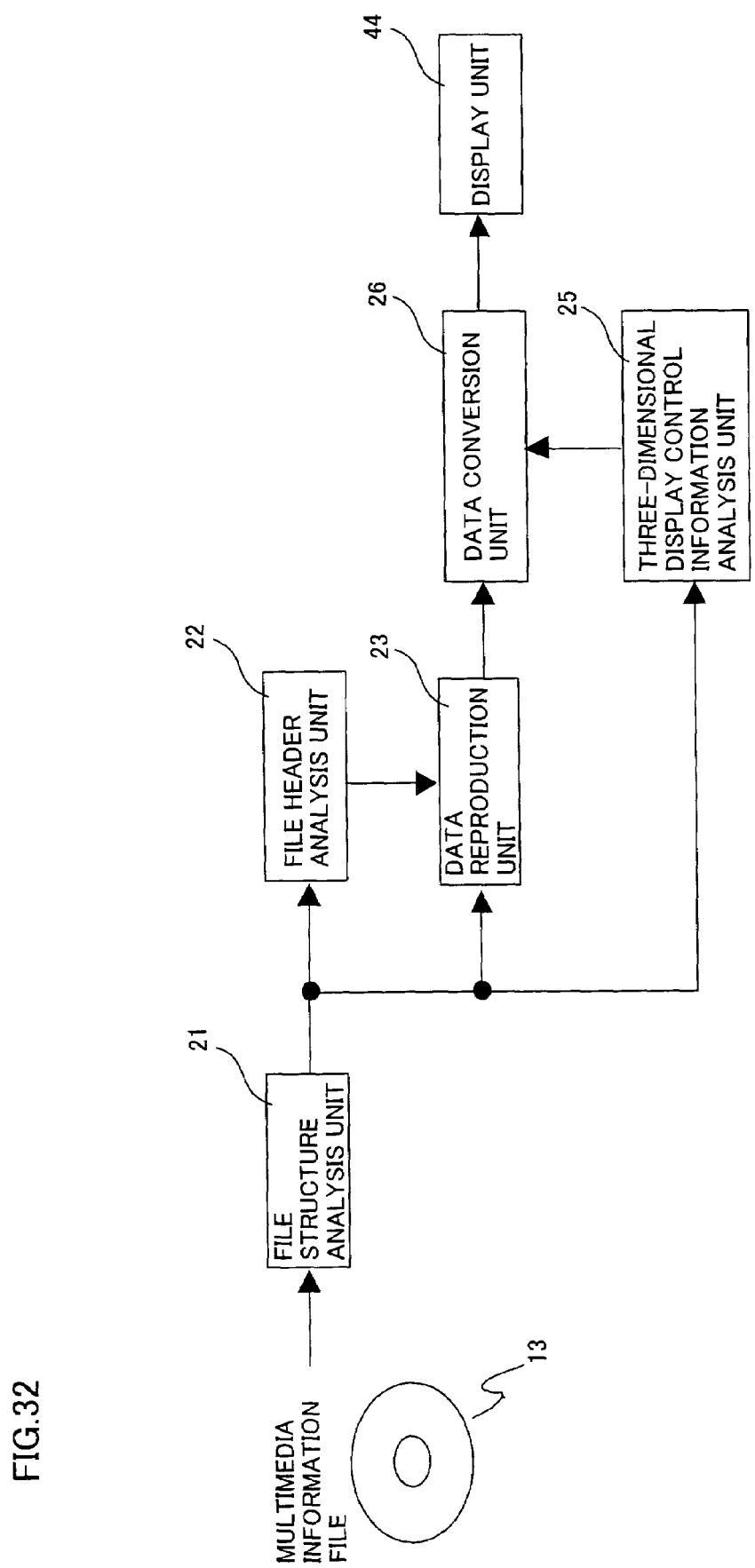
FIG. 32 is a block diagram showing a first variation of an image data reproduction apparatus.

Here, description of portions in FIG. 32 commonly found in the image data reproduction apparatus in FIG. 3 will not be repeated. The image data reproduction apparatus in FIG. 32 adapts to a case where the three-dimension identification information and the three-dimensional display control information are contained in the same object as shown in FIG. 28. Here, three-dimensional display control information analysis unit 25 analyzes presence/absence of the three-dimension identification information, and switches the display mode of display unit 44 in accordance with presence/absence thereof. That is, three-dimensional display control information analysis unit 25 also serves for file type determination. When the input multimedia information file contains the three-dimension identification information, display on display unit 44 is set to the three-dimensional display mode, and when it does not contain the three-dimension identification information, display on display unit 44 is set to the two-dimensional display mode.

If the display unit is dedicated for three-dimensional display, reproduction of a two-dimensional image file not having the three-dimension identification information or a two-dimensional image file not having the extension indicating the three-dimensional image file can be prevented by analyzing presence/absence of the three-dimension identification information or the extension. Alternatively, the two-dimensional image can be converted to an image for three-dimensional display. For example, a two-dimensional image is used for both an image for left eye and an image for right eye for display. If a display device and an image to be displayed have different resolution, display can be performed after resolution conversion or some kind of 2D-to-3D conversion. In contrast, if the display unit is dedicated for two-dimensional display, reproduction of a three-dimensional image file having the three-dimension identification information or a three-dimensional image file having the extension indicating the three-dimensional image file can be prevented. Alternatively, the three-dimensional image can be converted to an image for two-dimensional display. For example, either of an image for left eye or an image for right eye is selected for display as the two-dimensional image, or a two-dimensional image obtained by combining the image for left eye and the image for right eye can be displayed. If a display device and an image to be displayed have different resolution, display can be performed after resolution conversion.

(Another Structure 2 of Image Data Reproduction Apparatus)

Figure 33:
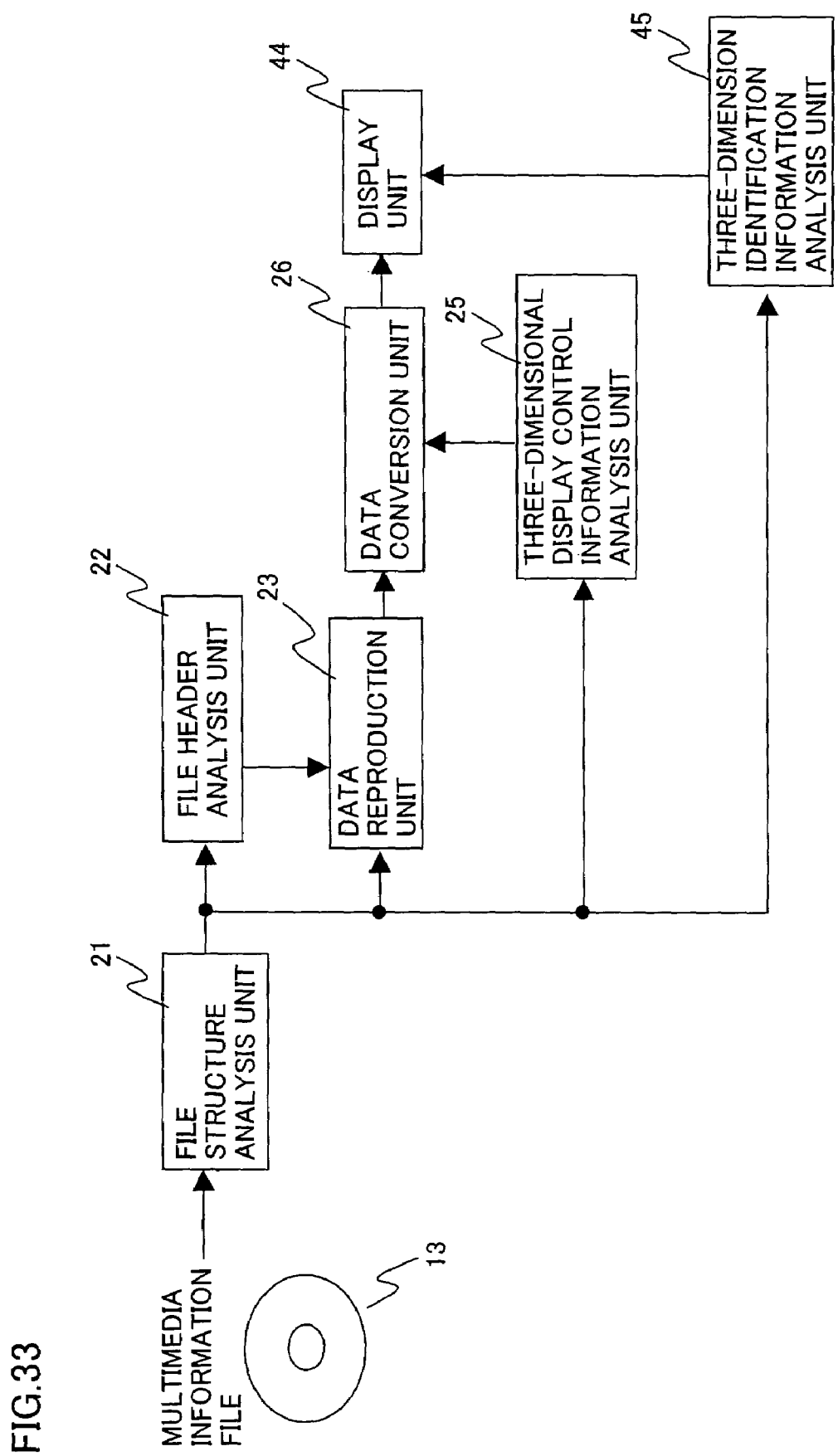
FIG. 33 is a block diagram showing a second variation of the image data reproduction apparatus.

The image data reproduction apparatus shown in FIG. 33 adapts to a case where the three-dimension identification information and the three-dimensional display control information are contained as separate objects as shown in FIG. 30. The image data reproduction apparatus in FIG. 33 is structured such that three-dimension identification information analysis unit 45 analyzes whether or not the multimedia information file contains three-dimension identification information, and the display mode of display unit 44 is switched in accordance with presence/absence of the three-dimension identification information. That is, three-dimension identification information analysis unit 45 is responsible for determining a file type.

(Another Structure 3 of Image Data Reproduction Apparatus)

When three-dimension identification is performed based on the extension as described above, switching between two-dimensional display and three-dimensional display can be made using the extension.

Figure 34:
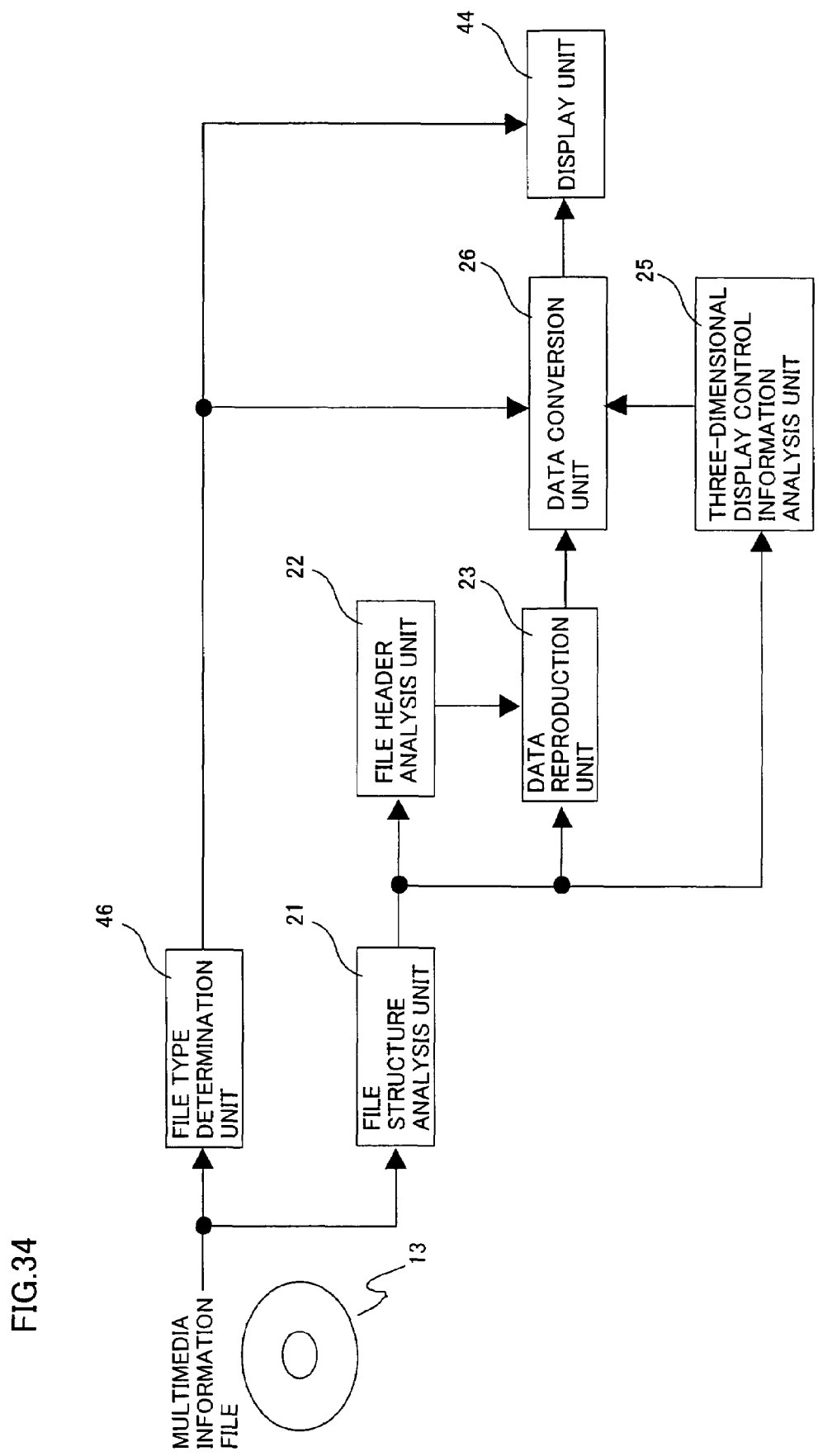
FIG. 34 is a block diagram showing a third variation of the image data reproduction apparatus.

FIG. 34 shows an example in which three-dimension identification is performed based on the extension in the image data reproduction apparatus. The image data reproduction apparatus controls the display mode of display unit 44 and a conversion method of data conversion unit 26 based on a result of analysis of the extension by file type determination unit 46.

As described above, the three-dimension identification information is used for determining whether or not the multimedia information file contains the three-dimensional image data. As to the encoding format of the image data, an identical format can commonly be used for both the two-dimensional image and the three-dimensional image, and a common decoder can be used. Here, a person would be able to determine whether a decoded image is to be output as the two-dimensional image or as the three-dimensional image by seeing the decoded image, whereas the reproduction apparatus is unable to do so. Therefore, the reproduction apparatus needs the three-dimension identification information for determination. Moreover, the three-dimension identification information is necessary not only for distinction between the two-dimensional image and the three-dimensional image but also for determining which of a plurality of three-dimensional display schemes is used. Automatic switching between the three-dimensional display mode and the two-dimensional display mode is enabled in accordance with a result of determination.

In FIG. 1A, only a single piece of three-dimensional display control information is contained in the multimedia information file. On the other hand, when the three-dimensional image data is formed from a plurality of images like a moving picture, one piece of three-dimensional display control information may be added to the beginning of each image data. Alternatively, the three-dimensional display control information may repeatedly be stored in an arbitrary position in the three-dimensional image data.

Figure 35:
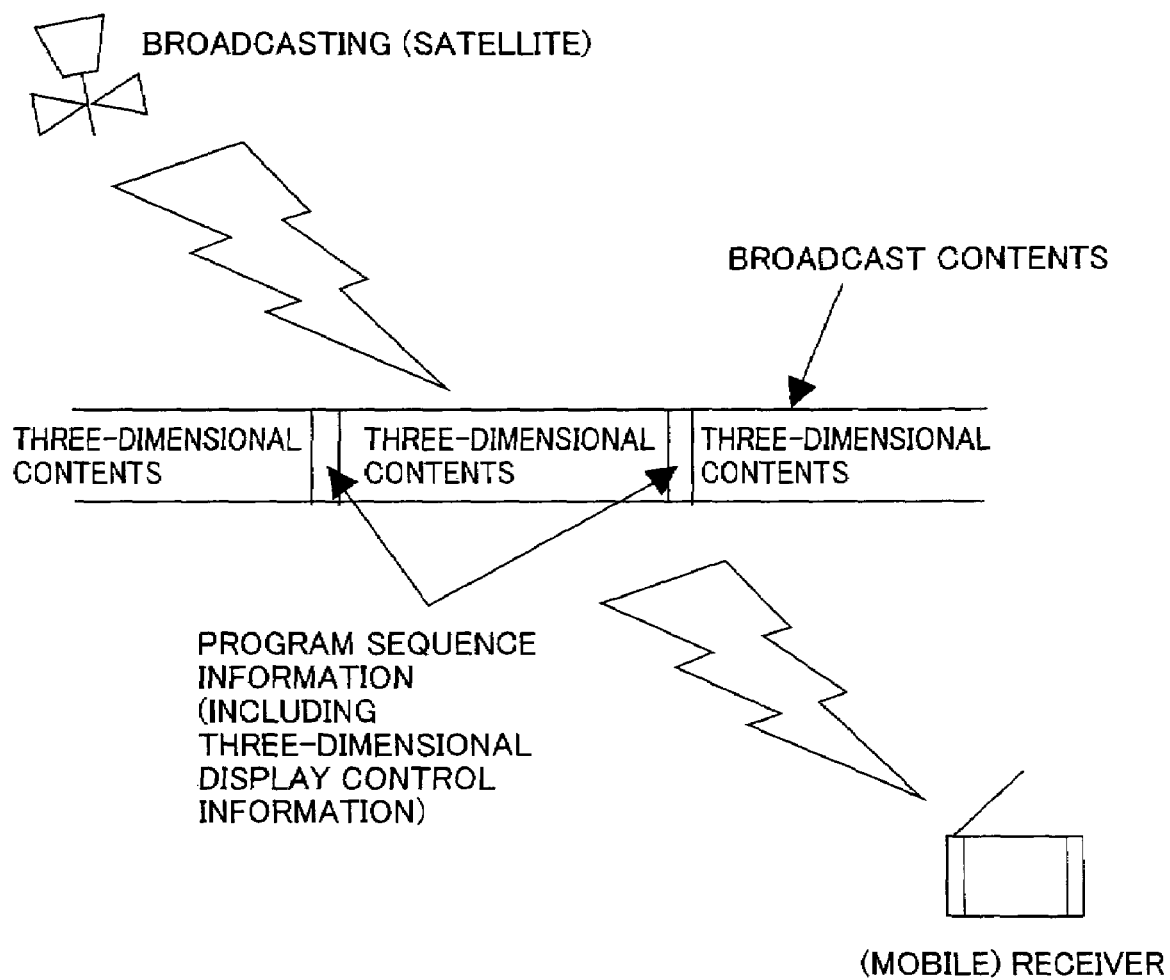
FIG. 35 shows three-dimension identification information regularly inserted in broadcast contents as program sequence information.

When a moving picture is broadcast via a satellite, a ground wave, the Internet, or the like, a viewer may start reception or viewing from somewhere during the broadcast or may switch a channel. Therefore, it is desirable to regularly insert the three-dimensional display control information in broadcast contents in a form of program sequence information as shown in FIG. 35, instead of arranging only one piece of three-dimensional display control information at the beginning. Here, the broadcast contents refer to encoded data obtained by multiplexing three-dimensional image data, audio data, BML data relevant to the contents thereof, and the like. The program sequence information includes information indicating mutual relation (synchronization information) among the image data, audio data, BML (Broadcast Markup Language) data, and the like, or copyright information. The program sequence information also includes the three-dimensional display control information. Here, the three-dimensional display control information may directly be multiplexed in the three-dimensional image data (encoded data) in a repeated manner, instead of being included in the program sequence information. In this manner, by repeatedly inserting the three-dimensional display control information or the three-dimension identification information in the broadcast contents, even if reproduction is started from a midpoint of the program, it is possible to know whether reception data is the three-dimensional image or not. If the reception data is the three-dimensional image, it is possible to know parameter information necessary for three-dimensional display.

(Recording Format of Multimedia Information on Medium)

In image data recording apparatus 100 shown in FIG. 2, a digital video tape can be employed as recording medium 13. Initially, a track format of the digital video tape recording according to the present embodiment will be described.

Figure 36:
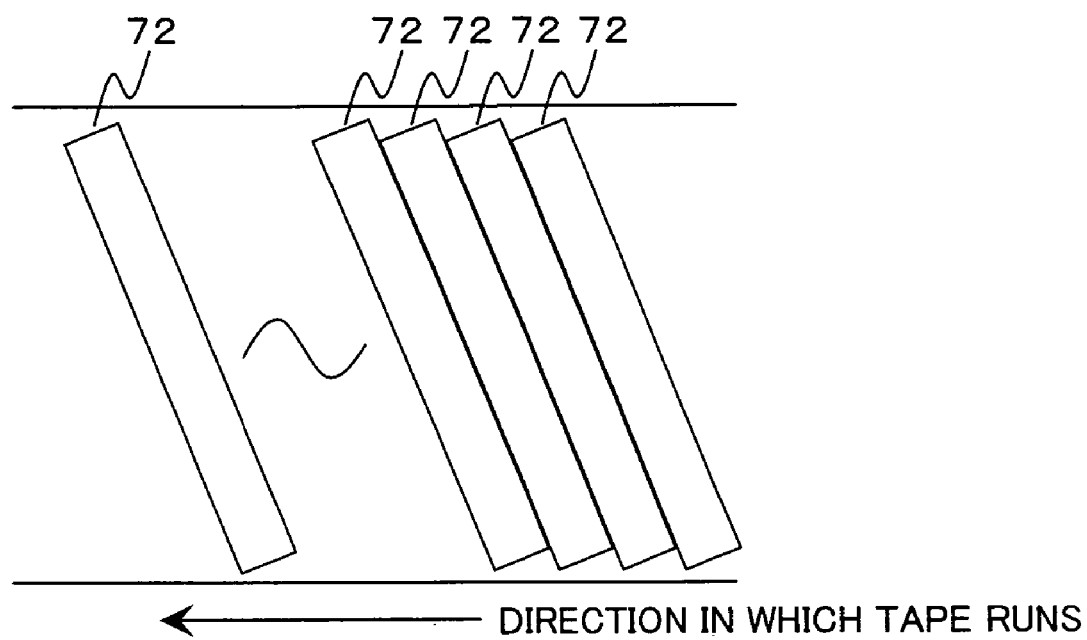
FIG. 36 illustrates a track that records data on a tape in a helical scanning scheme.

A widely-used digital VTR adopts a scheme called helical scanning, in which data is recorded on discontinuous tracks on the tape. As shown in FIG. 36, there are a plurality of tracks 72 on the tape and one three-dimensional image is divided and recorded on the plurality of tracks 72. The tape runs in a direction from right to left in FIG. 36. That is, a track at right end is scanned from the bottom to the top, and successively a track adjacent on the left is scanned from the bottom to the top.

Figure 37:
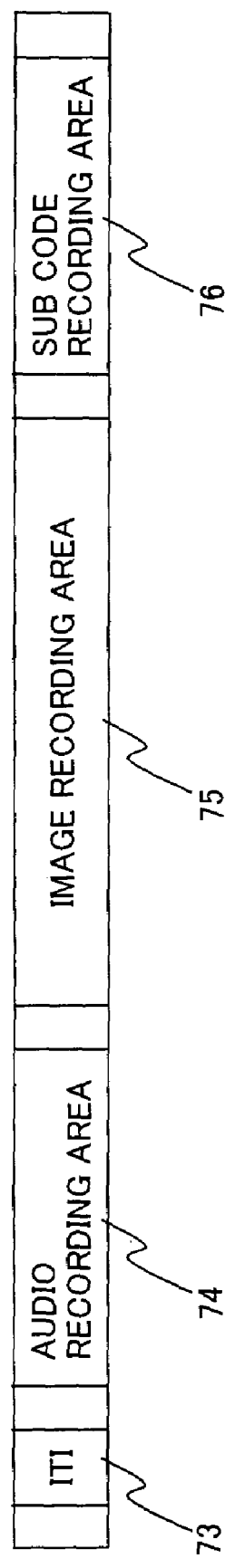
FIG. 37 is a diagram illustrating data configuration of one of tracks 72 in an enlarged manner.

FIG. 37 is an enlarged view of one of tracks 72, showing one example of a track format of the digital VTR recorded according to the present embodiment. Track 72 is constituted of an ITI (Insert and Track Information) area 73 for ensured dubbing, an audio recording area 74 recording data related to voice and sound, an image recording area 75 recording data related to an image, and a sub code recording area 76 recording associated information such as a time code. Image recording area 75 can record not only the three-dimensional image itself but also associated information related to the three-dimensional image. Similarly, audio recording area 74 can record not only the voice and sound but also associated information related to the voice and sound. Separately from these two areas, sub code recording area 76 can record the associated information as described previously. A margin is provided among respective areas, so as to allow individual dubbing.

Figure 38:
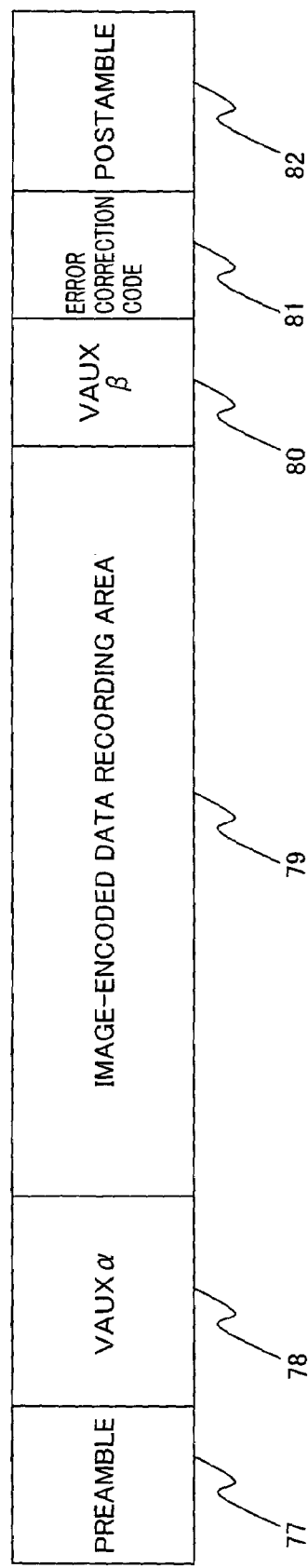
FIG. 38 is a diagram illustrating data configuration of an image recording area 75 in an enlarged manner.

FIG. 38 is an enlarged view of image recording area 75. Image recording area 75 is constituted of a preamble 77 recording a synchronization pattern or the like, VAUX (Video AUXiliary data) α 78 and VAUX β 80 recording the associated information related to the image, an image-encoded data recording area 79 recording encoded data of the image, an error correction code 81, and a postamble 82 attaining a function to secure a margin. Though an area recording the associated information related to the image is divided into VAUX α 78 and VAUX β 80, these two areas will hereinafter collectively be referred to as the VAUX area.

Though not shown, an AAUX (Audio AUXiliary data) area is also prepared for audio recording area 74 as the area for recording the associated information related to the voice and sound.

In the present embodiment, the three-dimensional display control information, the three-dimension identification information and the image pick-up condition information are recorded in either the VAUX area, the AAUX area or the sub code area. For example, the three-dimensional display control information can be recorded in the VAUX area, and the image pick-up condition information can be recorded in the sub code area. In addition, the three-dimensional display control information can be recorded in the VAUX area and the sub code area in a divided manner. Respective areas can be overwritten through individual dubbing. Therefore, information that may be subject to be changed during editing should possibly be recorded in the sub code area permitting facilitated dubbing.

Alternatively, all information may collectively be recorded in the VAUX area. Here, though facilitated dubbing is no longer possible, handling is advantageously facilitated because the associated information related to the image is gathered in one place. For example, when a copy is prepared in a medium adapted to another recording format, all information on the image can be obtained simply by producing a copy of the image recording area, thereby obviating the need for handling the sub code area. In addition, in order to avoid loss of such information due to overwriting through dubbing, the same information may be recorded in both the sub code area and the VAUX area.

A storage area in the sub code area and the VAUX area is limited due to their sizes. Therefore, if storage in these areas is no longer available, information related to the three-dimensional image can be recorded in the AAUX area.

The configuration according to the present embodiment complies with a digital VTR format widely used in a household, except for a portion specific to the three-dimensional image. Therefore, among the associated information recorded according to the present embodiment, the associated information specific to the three-dimensional image such as information on a method of combining left and right images, information on the stereo intensity, threshold information, or the like is recorded in an expansion area permitted in accordance with the home digital VTR format, so that the same tape can record a two-dimensional image and a three-dimensional image.

According to the description of the method of recording the image data of the present invention in connection with FIG. 2, the three-dimensional image display control information or the image pick-up condition information is recorded on recording medium 13. Generally, however, the three-dimensional image display control information or the image pick-up condition information can be recorded in a recording area of an image processor or a storage device provided in a terminal or in a recording area of an IC memory attached to a cassette tape. Here, as described so far, the recording area can include the image recording area, the audio recording area, the sub code area, or the like, so as to record the three-dimensional image display control information or the image pick-up condition information therein.

[Method of Generating Multimedia Information File]

In the following, a procedure for generating a multimedia information file as described above through an operation of image data recording apparatus 100 described in connection with FIG. 2 will be discussed.

Though file generation unit 12 has been assumed to receive the three-dimensional display control information and the three-dimensional image data in FIG. 2, in the following description, more generally, file generation unit 12 is assumed to receive also two-dimensional image data in addition to the three-dimensional display control information and the three-dimensional image data.

(Procedure 1 for Generating Multimedia Information File)

Figure 39:
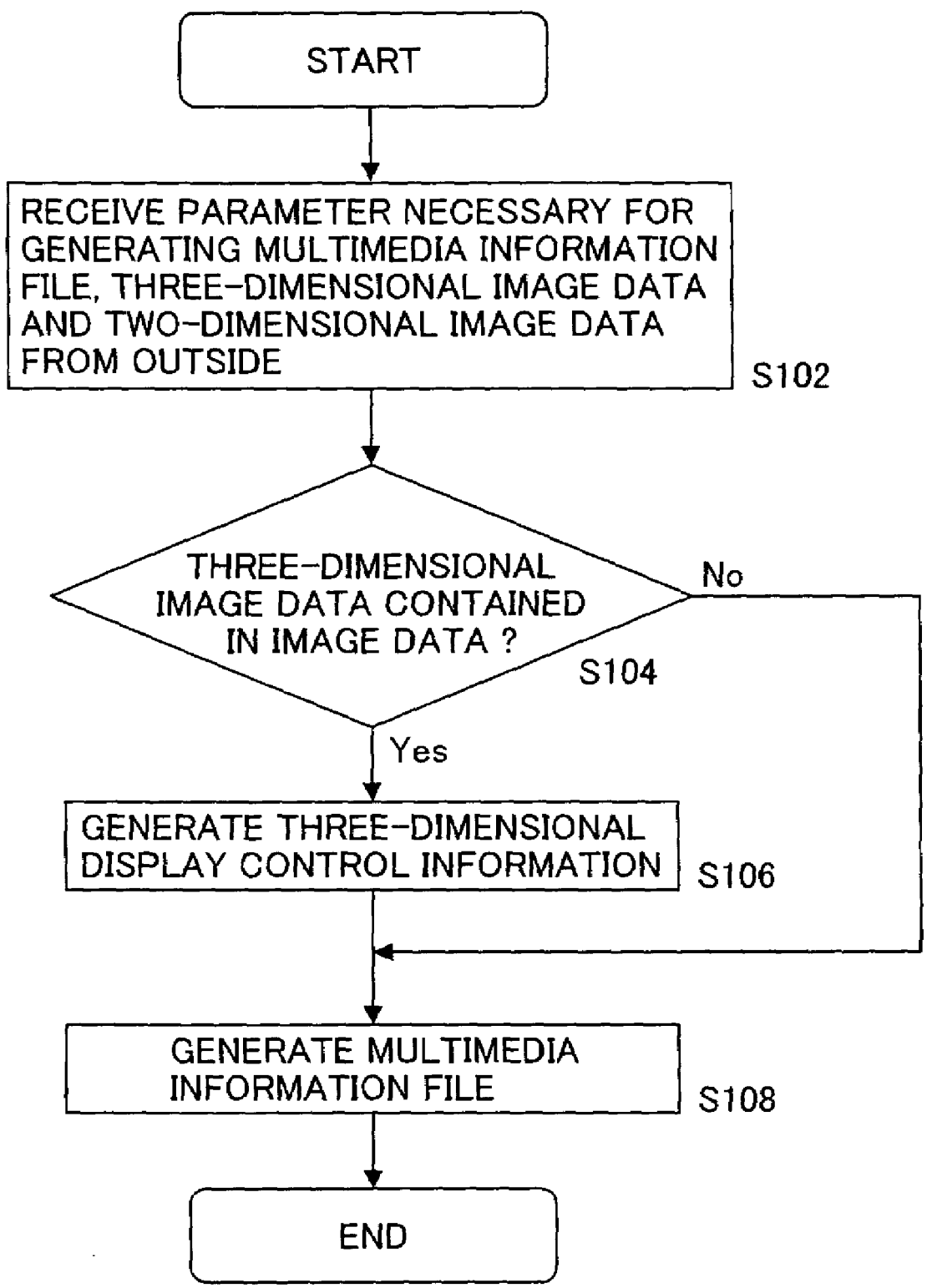
FIG. 39 is a flowchart illustrating a process flow in image data recording apparatus 100.

FIG. 39 is a flowchart illustrating a process flow in image data recording apparatus 100 shown in FIG. 2.

Referring to FIGS. 39 and 2, image data recording apparatus 100 receives a parameter necessary for generating multimedia information, three-dimensional image data, and two-dimensional image data from the outside (step S102). If the image data received from the outside includes the three-dimensional image data (step S104), three-dimensional display control information generation unit 11 generates three-dimensional control information (step S106). Upon receiving the three-dimensional display control information as well as the three-dimensional image data and the two-dimensional image data, file generation unit 12 generates and outputs a multimedia information file (step S108). Though the three-dimensional image data and the two-dimensional image data have been described as inputs, at least one input should only be provided. Alternatively, two or more inputs may be provided.

(Procedure 2 for Generating Multimedia Information File)

In the following, a procedure for adding the image pick-up condition information to the multimedia information file in addition to the three-dimensional display control information will be described.

As described in connection with FIG. 16, the multimedia information file may further include image pick-up condition information 42 in addition to three-dimensional display control information 2.

Such data related to the image pick-up condition is provided as a part of a parameter to three-dimensional display control information generation unit 11 in the structure of image data recording apparatus 100 shown in FIG. 2, for example. Here as well, file generation unit 12 can receive the two-dimensional image data in addition to the three-dimensional display control information and the three-dimensional image data.

Figure 40:
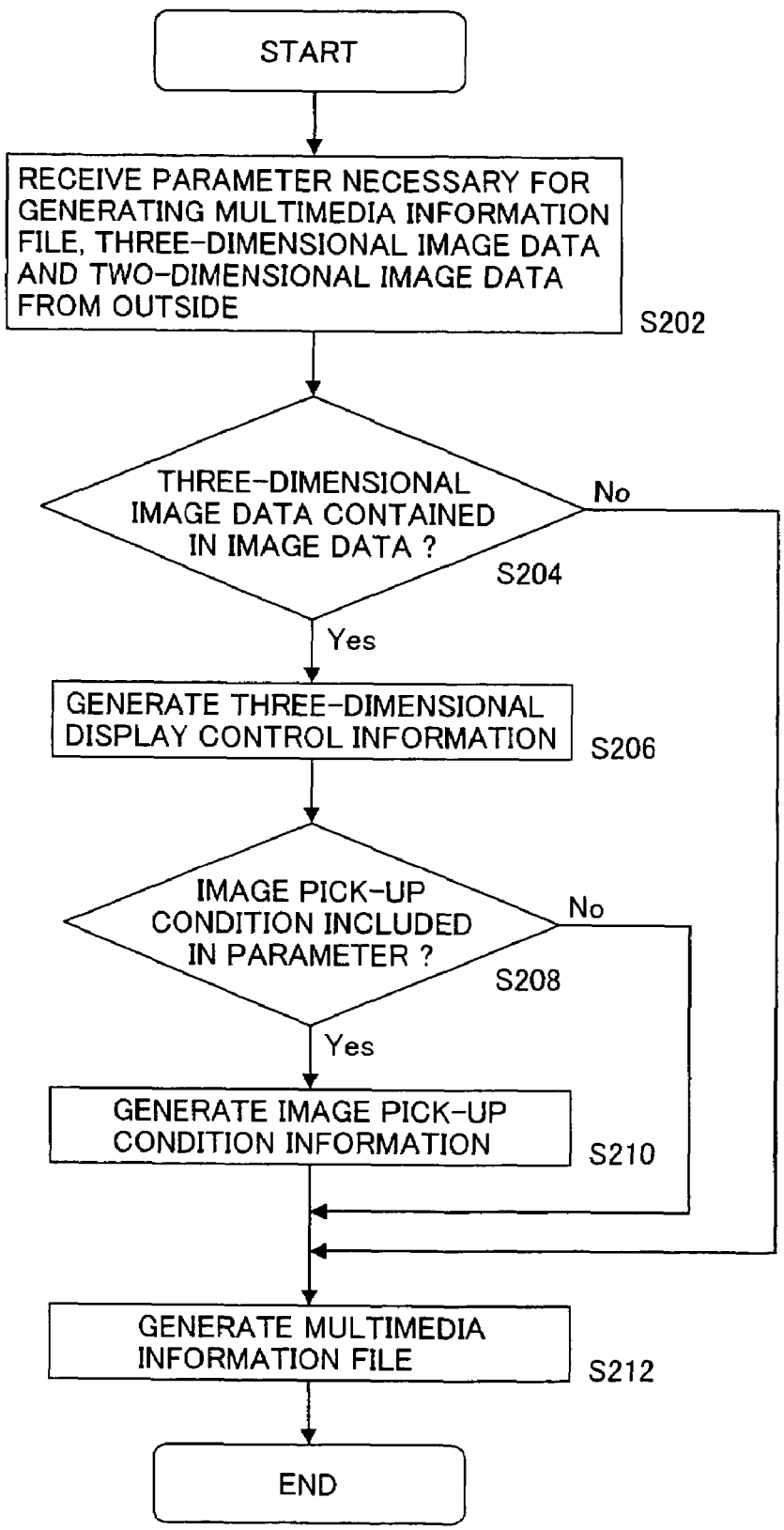
FIG. 40 is a flowchart illustrating a procedure for generating a multimedia information file further including the image pick-up condition information.

FIG. 40 is a flowchart illustrating a procedure for generating a multimedia information file further including the image pick-up condition information.

Referring to FIGS. 40 and 2, image data recording apparatus 100 receives a parameter necessary for generating multimedia information, three-dimensional image data, and two-dimensional image-data from the outside (step S202). If the image data received from the outside includes the three-dimensional image data (step S204), three-dimensional display control information generation unit 11 generates three-dimensional control information (step S206). On the other hand, if the image data received from the outside does not include the three-dimensional image data, the process proceeds to step S212.

If the image data includes the three-dimensional image data and if the data related to the image pick-up condition is given as a parameter (step S208), three-dimensional display control information generation unit 11 encodes the data related to the image pick-up condition in addition to three-dimensional display control information 2 described above so as to generate image pick-up condition information 42 as described above, and provides the generated information to file generation unit 12 (step S210).

File generation unit 12 generates a multimedia information file including both of image pick-up condition information 42 and three-dimensional image data 3 or at least one of the three-dimensional image data or the two-dimensional image data in addition to three-dimensional display control information 2, in accordance with information contained in the data provided as the parameter (step S212).

By structuring the multimedia information file as described above, the multimedia information in which the two-dimensional image data and the three-dimensional image data are present in a mixed manner can efficiently be stored, transmitted, and managed.

As described above, according to the image data generation apparatus, the image data reproduction apparatus, and the image data recording medium of the present invention, the image pick-up condition information indicating a condition in picking up an image of the three-dimensional image data is recorded or structured as a multimedia information file together with the three-dimensional image data. Therefore, the three-dimensional image data can be versatile, and one kind of multimedia information file can adapt to various edition schemes and retrieval methods in a flexible manner.

Alternatively, according to the present invention, information on the camera arrangement can efficiently be described. In addition, when the camera is arranged in a form of lattice, appropriate expression can be attained.

Alternatively, according to the image data generation apparatus, the image data recording format, and the image data recording medium of the present invention, the three-dimensional image display control information for displaying the three-dimensional image data is recorded or structured as a multimedia information file together with the three-dimensional image data. Therefore, the three-dimensional image data can be versatile, and one kind of multimedia information file can adapt to various three-dimensional display schemes in a flexible manner.

Alternatively, according to the image data reproduction apparatus of the present invention, by analyzing the three-dimensional image display control information included in the multimedia information file, conversion of the three-dimensional image data adapted to a display method can appropriately be performed, and correct display can be achieved.

Alternatively, according to the present invention, the three-dimensional image display control information includes information indicating the number of viewpoints of the three-dimensional image data. Accordingly, the three-dimensional image data having various numbers of viewpoints can be recorded, reproduced or structured as a versatile multimedia information file.

Alternatively, according to the present invention, the three-dimensional image display control information includes information indicating from which viewpoint position the three-dimensional image data is obtained. Accordingly, whether the three-dimensional image data is recorded as a plurality of streams or as a single stream, appropriate data conversion can be performed.

Alternatively, according to the present invention, the three-dimensional image display control information includes information indicating a direction of sub-sampling of the three-dimensional image data. Accordingly, data restoration in displaying can correctly be performed.

Alternatively, according to the present invention, the three-dimensional image display control information includes information indicating the arrangement of the camera that has picked up an image of the three-dimensional image data. Accordingly, appropriate viewpoint interpolation or three-dimensional model construction can be achieved.

Alternatively, according to the present invention, the three-dimensional image display control information includes information indicating a maximum shift amount when a parallax image of the three-dimensional image data is shifted. Accordingly, such a situation that what a creator of an image really wants to show is not displayed can be avoided.

Alternatively, according to the present invention, the three-dimensional image display control information includes information indicating whether or not a border is to be displayed around the image of the three-dimensional image data. Accordingly, a generator of the multimedia information file can select between displaying and not displaying the border image.

Alternatively, according to the present invention, the three-dimensional image display control information includes information indicating the border image data displayed around the image of the three-dimensional image data. Accordingly, an appropriate border image in accordance with the three-dimensional image data can be displayed.

Alternatively, according to the image data generation apparatus or the image data recording medium of the present invention, an effect among those enumerated below or an effect obtained by combining two or more of them can be achieved.

In other words, 1) according to the present invention, the image pick-up condition information indicating a condition in picking up an image of the three-dimensional image data is recorded or structured as a multimedia information file together with the three-dimensional image data. Therefore, the three-dimensional image data can be versatile, and one kind of multimedia information file can adapt to various edition schemes and retrieval methods in a flexible manner. In addition, appropriate viewpoint interpolation or three-dimensional model construction can be achieved.

2) According to the present invention, even if images from a plurality of viewpoints are obtained using the camera adapter, an image pick-up condition can be described as in the case where a plurality of cameras are used.

3) According to the present invention, the three-dimensional image display control information or the image pick-up condition information is recorded in the sub code area permitting facilitated dubbing. Therefore, convenience during editing can be improved.

4) According to the present invention, the three-dimensional image display control information or the image pick-up condition information is collectively recorded in the image recording area, thereby facilitating handling.

5) According to the present invention, the three-dimensional image display control information or the image pick-up condition information is recorded in both the sub code area and the image recording area. Therefore, data loss due to overwriting during dubbing can be prevented.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. An image data reproduction apparatus for reproducing a multimedia information file generated by an image data generation apparatus, said image data generation apparatus generating the multimedia information file capable of including both of externally received three-dimensional image data and three-dimensional image display control information, or externally received at least two-dimensional image data, and said three-dimensional image display control information including first information indicating border image data to be displayed around an image of said three-dimensional image data, comprising:
reception means for receiving the multimedia information file;
file structure analysis means for analyzing a structure of said multimedia information file so as to extract said three-dimensional image display control information and said three-dimensional image data or said two-dimensional image data;
three-dimensional image display control information analysis means for analyzing said three-dimensional image display control information;
data reproduction means for reproducing said three-dimensional image data; and
data conversion means for converting reproduced said three-dimensional image data, said data conversion means converting said reproduced three-dimensional image data for display based on a result of analysis by said three-dimensional image display control information analysis means, and in accordance with said first information in received said three-dimensional image display control information, said three-dimensional image display control information analysis means selecting border image data included in said first information when said first information includes said border image data and selects one of at least one border image prepared in advance when said first information does not include said border image data, and outputting selected one to said data conversion means, wherein said three-dimensional image display control information further includes second information indicating whether a border is to be displayed around the image of said three-dimensional image data, using said border image data, and said three-dimensional image display control information analysis means analyzes information on presence/absence of border display in accordance with said second information, and when the border is to be displayed, further in accordance with said first information in received said three-dimensional image display control information, said three-dimensional image display control information analysis means selects border image data included in said first information when said first information includes said border image data, and selects one of at least one said border image prepared in advance when said first information does not include said border image data, and outputs selected one to said data conversion means.

2. An image data reproduction apparatus for reproducing a multimedia information file generated by an image data generation apparatus, said image data generation apparatus generating the multimedia information file capable of including both of externally received three-dimensional image data and three-dimensional image display control information, or externally received at least two-dimensional image data, and said three-dimensional image display control information including first information indicating border image data to be displayed around an image of said three-dimensional image data, comprising:

reception means for receiving the multimedia information file;

file structure analysis means for analyzing a structure of said multimedia information file so as to extract said three-dimensional image display control information and said three-dimensional image data or said two-dimensional image data;

three-dimensional image display control information analysis means for analyzing said three-dimensional image display control information;

data reproduction means for reproducing said three-dimensional image data; and data conversion means for converting reproduced said three-dimensional image data, said data conversion means converting said reproduced three-dimensional image data for display based on a result of analysis by said three-dimensional image display control information analysis means, and in accordance with said first information in received said three-dimensional image display control information, said three-dimensional image display control information analysis means selecting border image data included in said first information when said first information includes said border image data and selects one of at least one border image prepared in advance when said first information does not include said border image data, and outputting selected one to said data conversion means, wherein said three-dimensional image display control information further includes second information indicating whether a border is to be displayed around an image of said three-dimensional image data, using said border image data, and in said step of analyzing said three-dimensional image display control information, information on presence/absence of border display is analyzed in accordance with said second information, and when the border is to be displayed, further in accordance with said first information in received said three-dimensional image display control information, border image data included in said first information is selected when said first information includes said border image data, and one of at least one said border image prepared in advance is selected when said first information does not include said border image data.

* * * * *